United States Patent
Panaccione et al.

(10) Patent No.: US 11,014,041 B2
(45) Date of Patent: May 25, 2021

(54) CARBON DIOXIDE CAPTURE SYSTEM AND SPECTROSCOPIC EVALUATION THEREOF

(71) Applicant: ION Engineering, LLC, Boulder, CO (US)

(72) Inventors: Charles Panaccione, Boulder, CO (US); Nathan R. Brown, Oslo (NO); Erik Everhardus Bernardus Meuleman, Boulder, CO (US)

(73) Assignee: ION Engineering, LLC, Boulder, CO (US)

( * ) Notice: Subject to any disclaimer, the term of this patent is extended or adjusted under 35 U.S.C. 154(b) by 85 days.

(21) Appl. No.: 16/490,877

(22) PCT Filed: Mar. 5, 2018

(86) PCT No.: PCT/US2018/020929
§ 371 (c)(1),
(2) Date: Sep. 3, 2019

(87) PCT Pub. No.: WO2018/165029
PCT Pub. Date: Sep. 13, 2018

(65) Prior Publication Data
US 2020/0009499 A1 Jan. 9, 2020

Related U.S. Application Data

(60) Provisional application No. 62/468,236, filed on Mar. 7, 2017, provisional application No. 62/467,701, filed on Mar. 6, 2017.

(51) Int. Cl.
*B01D 53/18* (2006.01)
*G01N 21/3504* (2014.01)
*G06N 20/00* (2019.01)
*B01D 53/14* (2006.01)
*G01N 21/35* (2014.01)

(52) U.S. Cl.
CPC ..... *B01D 53/1412* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS 5,618,506 A 4/1997 Suzuki et al.
5,773,825 A 6/1998 Doyle
(Continued)

OTHER PUBLICATIONS

Kuenemann et al., "Cheminformatics Modeling of Amine Solutions for Assessing their CO2 Absorption Properties", Molecular Informatics, 2017, pp. 1-13. (Year: 2017).*

(Continued)

*Primary Examiner* — Philip Y Louie
(74) *Attorney, Agent, or Firm* — Snell & Wilmer L.L.P.

(57) ABSTRACT

A chemical processing system for removing carbon dioxide from a gas mixture using a multicomponent amine-based scrubbing solution includes a spectroscopic evaluation system with a liquid contact probe for spectroscopic investigation, an energy source connected with the liquid contact probe to provide the spectroscopic stimulation energy to the probe, a spectrometer connected with the liquid contact probe to detect the spectroscopic response energy to the probe and to output spectral data corresponding to the spectroscopic response energy, and a machine learning spectral data analyzer connected to the spectrometer for evaluation of the spectral data to determine a concentration value for each of water, amine component and captured carbon dioxide in the scrubbing solution, the machine learning spectral data analyzer being trained for each such component over a corresponding trained concentration range, and (Continued)

optionally over a trained temperature range to provide a temperature-compensated concentration value.

20 Claims, 9 Drawing Sheets

(52) U.S. Cl.
CPC ......... *B01D 53/18* (2013.01); *G01N 21/3504* (2013.01); *B01D 2252/204* (2013.01); *G01N 2021/3595* (2013.01)

(56) References Cited

U.S. PATENT DOCUMENTS

| | | | |
|---|---|---|---|
| 8,512,660 | B2 | 8/2013 | Engelke et al. |
| 8,814,989 | B2 | 8/2014 | Thiele et al. |
| 2011/0052453 | A1 | 3/2011 | McLarnon et al. |
| 2014/0054464 | A1* | 2/2014 | Lake ................. B01D 53/1493 250/341.1 |
| 2014/0178278 | A1 | 6/2014 | Siskin et al. |
| 2015/0125372 | A1 | 5/2015 | Stites et al. |
| 2016/0030880 | A1 | 2/2016 | Wong et al. |

OTHER PUBLICATIONS

Ben-Hur et al.; "A User's Guide to Support Vector Machines"; Chapter 13; in O. Carugo, F. Eisenhaber (eds.), Data Mining Techniques for Life Sciences; Methods in Molecular Biology; 609; Humana Press; 2010; pp. 223-239.

Bochko et al.; "Chemometrics: Classification of Spectra"; University of Vaasa; Nov. 1, 2010; 36 pages.

Ciftja et al.; "Comparison of Spectroscopic Methods for CO2 Capture"; 2nd Post Combustion Capture Conference (PCCC2); 2013; 3 pages.

Einbu et al.; "Online Analysis of Amine Concentration and CO2 Loading in MEA Solutions by ATR-FTIR Spectroscopy"; SciVerse ScienceDirect; Energy Procedia; 23; 2012; pp. 55-63.

Kachko et al.; "Real-Time Process Monitoring of CO2 Capture by Aqueous AMP-PZ Using Chemometrics: Pilot Plant Demonstration"; Industrial & Engineering Chemistry Research; 2015; pp. A-H.

Luts et al.; A Tutorial on Support Vector Machine-Based Methods for Classification Problems in Chemometrics; Analytica Chimica Acta 665; 2010; pp. 129-145.

Rosipal; "Nonlinear Partial Least Squares: An Overview"; in H. Lodhi, Y. Yamanishi (eds.); Chemoinformatics and Advanced Machine Learning Perspective; IGI Global; 2011; pp. 1-20.

Rosipal et al.; "Nonlinear Kernel-Based Chemometric Tools: a Machine Learning Approach"; International Symposium on PLS; 2003; 12 pages.

L.V. van der Ham; "Online Monitoring of Dissolved CO2 and MEA Concentrations: Effect of Solvent Degradation on Predictive Accuracy"; Science Direct; Energy Procedia 63; 2014; pp. 1223-1228.

Zhan et al.; "Inline Measurement of Particle Concentrations in Multicomponent Suspensions Using Ultrasonic Sensor and Least Squares Support Vector Machines"; Sensors 15; 2015; pp. 24109-24124.

* cited by examiner

CARBON DIOXIDE CAPTURE SYSTEM AND SPECTROSCOPIC EVALUATION THEREOF

RELATED APPLICATIONS

This application claims the benefit of U.S. Provisional Patent Application No. 62/467,701 filed on Mar. 6, 2017 and U.S. Provisional Patent Application No. 62/468,236 filed Mar. 7, 2017, each entitled "CARBON DIOXIDE CAPTURE SYSTEM AND SPECTROSCOPIC EVALUATION THEREOF", and each of which, and each and every portion of which, is incorporated herein by reference.

STATEMENT ON FEDERALLY SPONSORED RESEARCH OR DEVELOPMENT

This invention was made with government support under award no. DE-FE0013303 awarded by the Department of Energy. The government has certain rights in the invention.

BACKGROUND

Carbon dioxide scrubbing with amine-based scrubbing solutions has been used widely for removing carbon dioxide from natural gas and petroleum gas streams as part of gas sweetening operations. These scrubbing operations tend to be at high pressure. More recently, amine-based scrubbing systems have been used for removing carbon dioxide from power plant and industrial flue gas streams in lower-pressure systems, such as for carbon dioxide capture for sequestration. The scrubbing solutions may contain one or more amine compounds active for carbon dioxide capture in solution and are often prepared as aqueous solutions with the amine compounds dissolved in water, although a variety of non-aqueous amine-based scrubbing solutions have also been described for use in amine-based scrubbing of carbon dioxide. In addition to one or more amine compounds active for carbon dioxide capture, such scrubbing solutions may optionally include other components (typically also dissolved in water in aqueous scrubbing solutions), for example to promote more rapid absorption of carbon dioxide into the scrubbing solution (carbon dioxide absorption kinetics), to promote more rapid transfer of carbon dioxide to the amine compound for capture and/or to increase solubility of carbon dioxide in the scrubbing solution.

A common carbon dioxide capture system includes a scrubbing operation in which the scrubbing solution is contacted with a carbon dioxide-containing gas mixture (e.g., natural gas for gas sweetening or flue gas for carbon dioxide sequestration) to remove carbon dioxide from the gas mixture. Resulting rich scrubbing solution loaded with captured carbon dioxide is then processed through a regeneration operation in which carbon dioxide is stripped from the scrubbing solution to regenerate a lean scrubbing solution for further use for carbon dioxide capture in the scrubbing operation. Regeneration involves subjecting the scrubbing solution to conditions (e.g., temperature and pressure) different than conditions during the scrubbing operation at which the scrubbing solution has a reduced capacity for carbon dioxide loading. Frequently, the regeneration operation will subject the scrubbing solution to a significantly higher temperature than temperatures during the scrubbing operation.

Amine based scrubbing solutions may become degraded over time during carbon dioxide scrubbing and regeneration operations, and used scrubbing solution may need to be removed (bled) from the system and replaced with fresh scrubbing solution. Degradation of scrubbing solution may result from build-up of contaminants, which may come from the gas stream being treated and/or may result from degradation by products formed in the scrubbing solution. Additionally, some amount of the organic components such as the amine compounds may volatilize and be lost in product gas streams, for example in the purified gas stream from the scrubbing operation after carbon dioxide removal or in the carbon dioxide gas stream from regeneration operations. Unacceptable gain or loss of water in the scrubbing solution over time may also contribute to scrubbing solution degradation. For example, water gains may come from humidity in flue gas feed streams and water losses may result from water vapor exiting in product gas streams. Replacement of degraded scrubbing solution represents a significant expense for carbon dioxide capture, both due to the cost of providing fresh scrubbing solution and to the costs of treating and/or disposing of the degraded scrubbing solution or contaminant components thereof. These issues are significant for applications involving gas sweetening of natural gas or petroleum gas, and become even more significant for carbon dioxide sequestration applications as a result of much larger anticipated volumes of scrubbing solution used and the different chemistries involved with treating gas streams such as combustion flue gas relative to natural gas or petroleum gas streams.

Capture of carbon dioxide into amine-based scrubbing solutions may be a highly exothermic process, providing potential for generation of higher temperatures during scrubbing operations than may be desired for optimal carbon dioxide capture. Also, combustion flue gas streams tend to have a significant amount of oxygen gas, unlike most natural gas or petroleum gas sweetening operations, and in the case of processing such combustion flue gases there is significant potential for generation of oxidative degradation products, which represent both a loss of scrubbing solution and potential environmental emission control complications. Oxidative degradation reactions have faster kinetics at higher temperatures, and even relatively small excesses in the temperature during a scrubbing operation relative to what is desired for carbon dioxide capture may have a significant detrimental impact on the rate at which such degradation products are generated. Excessive temperatures during scrubbing may also result in a higher level of thermal degradation products. The higher temperatures to which the scrubbing solution may be subjected during regeneration operations also present significant potential for generating thermal degradation products, although potential for oxidative degradation is reduced during regeneration since there tends to be very little oxygen present during regeneration processing.

There is a significant need for accurate and robust process monitoring systems for monitoring amine-based scrubbing solutions during carbon dioxide capture operations, which need is heightened with the expanded use of such processing for carbon dioxide removal and sequestration from combustion flue gas and other industrial gas streams. Effective monitoring of scrubbing solutions may permit efficient use of scrubbing solution to enhance carbon dioxide capture and informed decisions on when a scrubbing solution has degraded to a point appropriate for replacement with fresh scrubbing solution, and effective monitoring may be incorporated into process control to more effectively operate to reduce formation of degradation byproducts.

Multivariate chemometric evaluation for component concentrations in amine-based scrubbing solutions has been performed using spectroscopic evaluation techniques involving spectroscopic investigation using Fourier transform infrared (FT-IR) spectroscopy with data analysis based on principal component analysis (PCA) and partial least squares (PLS) regression. Principal component analysis involves identifying particular spectral bands indicative of the particular components being evaluated to remove interference in the analysis from spectral portions not associated with such components. The selected spectral bands are then analyzed with a partial least squares regression analysis to determine concentrations for the selected components. FT-IR/PCA/PLS techniques may provide good concentration predictions for multiple scrubbing solution components, but current FT-IR/PCA/PLS techniques have some limitations. FT-IR/PCA/PLS system performance and accuracy tends to be very sensitive to process variations, and as a result the spectroscopic investigation conditions tend to be highly controlled. Sensitivity to temperature variations as well as potential interference in selected PCA spectral bands from the presence of unanticipated components such as degradation products are significant concerns. Careful selection of the PCA spectral bands is of critical importance, both with respect to particular spectral wavelengths selected for evaluation and the width of the selected PCA spectral bands. Analysis results are sensitive to changes in temperature, and as a result liquid samples may be conditioned to a controlled uniform temperature for the FT-IR spectroscopic investigation. Such temperature conditioning takes time, both for the for temperature adjustment and to collect and transport the liquid sample to the temperature-controlled environment where the spectroscopic investigation is performed, significantly reducing the utility of the systems for real time or near real time analysis and limiting effectiveness for use of such systems for monitoring actual reaction conditions or for process control purposes. Also, the temperature changes and time delays associated with such temperature conditioning may alter the composition of a liquid sample between collection and spectroscopic investigation, for example through continued reaction occurring during a time delay in reacting mixtures and changes in chemical reaction equilibria or component vapor pressures.

SUMMARY

One aspect of this disclosure provides a spectroscopic evaluation system. It has been found that many of the limitations of conventional FT-IR/PCA/PLS spectroscopic evaluation systems for monitoring the multicomponent liquid compositions of amine-based scrubbing solutions for carbon dioxide capture may be addressed through a spectroscopic evaluation system of this disclosure. The spectroscopic evaluation system may include:
  a liquid contact probe configured to contact a multicomponent liquid composition for spectroscopic investigation and to transmit spectroscopic stimulation energy to interact with the multicomponent liquid composition for the spectroscopic investigation and resulting spectroscopic response energy away from the multicomponent liquid composition;
  an energy source connected with the liquid contact probe to provide the spectroscopic stimulation energy for the spectroscopic investigation;
  a spectrometer connected with the liquid contact probe to detect the spectroscopic response energy and to output spectral data corresponding to the spectroscopic response energy; and
  a machine learning spectral data analyzer connected to the spectrometer for evaluation of the spectral data to determine a concentration value for each one of a plurality of components of the multicomponent liquid composition, wherein the machine learning spectral data analyzer is trained for each said component of the plurality of components over a corresponding trained concentration range for the said component. Rather than requiring selection of discrete spectral bands as features for analysis as is the case with principal component analysis, the machine learning spectral data analyzer may process full spectrum spectral data as generated by a spectrometer, such as an FT-IR or other spectrometer. Essentially all of the measured spectrum provides features for evaluation. As opposed to the potential negative interference with accuracy in conventional FT-IR/PCA/PLS systems, the additional information contained in the full spectrum data may be advantageously used to enhance both accuracy and robustness of the spectroscopic evaluation system. Also, the spectroscopic evaluation system with the machine learning spectral data analyzer may be configured to operate over significant temperature ranges, and sample fluids may not need to be conditioned to a set constant temperature for evaluation. The machine learning spectral data analyzer may be trained for temperature effect on the spectral data over a trained temperature range to provide a temperature-compensated value for the concentration value of each target component for different temperatures across the full range of the trained temperature range. In addition to determining values for concentrations of multiple components, the machine learning spectral data analyzer may also determine the temperature of the investigated liquid. This advantageously permits process liquids to be spectroscopically investigated in situ (e.g., with investigation of the liquid composition in a reaction vessel or other process vessel or in a flowing process stream directly under process conditions) to directly monitor processing conditions in process vessels and flowing process streams, providing more representative and accurate process information both for assessing process performance and for use for process control. Rather than being a detriment as in conventional FT-IR/PCA/PLS systems, temperature effects in the spectral data may be beneficially used to provide additional information on the investigated liquid and actual processing conditions.

Another aspect of this disclosure provides a chemical processing system for removing carbon dioxide from a carbon dioxide-containing gas mixture using an amine-based scrubbing solution (which may optionally be an aqueous solution) that is a multicomponent liquid composition comprising water, at least one amine component for carbon dioxide capture and captured carbon dioxide. The chemical processing system may comprise:
  a carbon dioxide scrubbing unit to contact the gas mixture with the amine-based scrubbing solution for capture of carbon dioxide from the gas mixture in the scrubbing solution, the scrubbing unit comprising:
    a first gas inlet to receive a feed stream of the gas mixture to the scrubbing unit with carbon dioxide for removal in the scrubbing unit;
    a first gas outlet to output a treated stream of the gas mixture from the scrubbing unit having a lower carbon dioxide concentration than the feed stream of the gas mixture to the scrubbing unit;
    a first liquid inlet to receive a feed stream of said scrubbing solution for processing in the scrubbing unit to contact the gas mixture to remove carbon dioxide from the gas mixture for capture in the scrubbing solution; and a first liquid outlet to output an effluent stream of rich said scrubbing solution from the scrubbing unit, the rich said scrubbing solution having a concentration of captured carbon dioxide that is larger than a concentration of captured carbon dioxide in the feed stream of said scrubbing solution;

a scrubbing solution regeneration unit to remove at least a portion of the captured carbon dioxide from the rich said scrubbing solution and prepare a lean said scrubbing solution depleted in the captured carbon dioxide relative to the rich said scrubbing solution, the regeneration unit comprising:

a second liquid inlet to receive for processing in the regeneration unit a feed stream to the regeneration unit including at least a portion of the rich said scrubbing solution;

a second gas outlet to output a gas effluent stream from the regeneration unit rich in carbon dioxide released from the scrubbing solution in the regeneration unit; and a second liquid outlet to output a liquid effluent stream from the regeneration unit including at least a portion of the lean said scrubbing solution;

a first fluid communication path between the second liquid outlet of the regeneration unit and the first liquid inlet of the scrubbing unit to conduct at least a portion of the lean scrubbing solution from the regeneration unit to the scrubbing unit in the feed stream of said scrubbing solution;

a second fluid communication path between the first liquid outlet of the scrubbing unit and the second liquid inlet of the regeneration unit to conduct at least a portion of the rich said scrubbing solution from the scrubbing unit to the regeneration unit;

a spectroscopic evaluation system, which optionally may be automated to automatically periodically perform spectroscopic investigations, comprising:

a liquid contact probe configured to contact a multicomponent liquid composition for spectroscopic investigation and to transmit spectroscopic stimulation energy to interact with the multicomponent liquid composition for the spectroscopic investigation and resulting spectroscopic response energy away from the multicomponent liquid composition;

an energy source connected with the liquid contact probe to provide the spectroscopic stimulation energy for the spectroscopic investigation;

a spectrometer connected with the liquid contact probe to detect the spectroscopic response energy and to output spectral data corresponding to the spectroscopic response energy;

a machine learning spectral data analyzer connected to the spectrometer for evaluation of the spectral data to determine a concentration value for each one of a plurality of components of the multicomponent liquid composition, the plurality of components including the water, a said amine component and the captured carbon dioxide, wherein the machine learning spectral data analyzer is trained for each said component of the plurality of components over a corresponding trained concentration range for the said component; and the liquid contact probe is positioned to contact the scrubbing solution in a location in the scrubbing unit, the regeneration unit, the first fluid communication path or the second fluid communication path, and optionally multiple such liquid contact probes may be positioned to contact the scrubbing solution in multiple ones of such locations.

Another aspect of this disclosure provides an amine-based chemical processing method for removing carbon dioxide from a carbon dioxide-containing gas mixture the method comprising:

carbon recovery processing of the gas mixture with an amine-based scrubbing solution (which may optionally be an aqueous solution) that is a multicomponent liquid composition comprising water, at least one amine component for carbon dioxide capture and captured carbon dioxide, the carbon recovery processing including:

scrubbing processing, comprising capturing carbon dioxide from the gas mixture in the scrubbing solution, to prepare a rich said scrubbing solution enriched in the captured carbon dioxide relative to feed of said scrubbing solution to the scrubbing processing; and regeneration processing, comprising removing at least a portion of the captured carbon dioxide from at least a portion of the rich said scrubbing solution to prepare lean said scrubbing solution depleted in captured carbon dioxide relative to the rich said scrubbing solution; and recycling at least a portion of the lean said scrubbing solution in the feed of said scrubbing solution to the scrubbing processing to capture additional carbon dioxide;

automated spectroscopic evaluation of operation of the carbon recovery processing by an automated spectroscopic evaluation system, comprising automatically performing by the spectroscopic evaluation system:

periodic in-line spectroscopic investigation of the scrubbing solution for at least one location in the carbon recovery processing to generate spectroscopic response spectral data indicative of properties of the scrubbing solution at the corresponding said location of the spectroscopic investigation; and trained machine learning evaluation of the spectral data by a machine learning spectral data analyzer to determine a concentration value for each one of a plurality of components of the multicomponent liquid composition, the plurality of components including the water, a said amine component and the captured carbon dioxide, wherein the machine learning spectral data analyzer is trained for each said component of the plurality of components over a corresponding trained concentration range for the said component.

The spectroscopic evaluation system is described herein primarily with reference to use in relation to chemical processing involving carbon dioxide capture using amine-based scrubbing solutions. In such a case, the plurality of components in the multicomponent liquid composition may include water, at least one amine component for capture of carbon dioxide and captured carbon dioxide, and the plurality of components for which concentration values are determined may include the water, a said amine component and the captured carbon dioxide, and wherein the machine learning spectral data analyzer is trained for each such component of the plurality of components over a corresponding trained concentration range for such component. However, use of the spectroscopic evaluation system is not limited to carbon dioxide capture processing or to use only with an amine-based scrubbing solutions for carbon dioxide capture, and may be used for other chemical processing systems and with other multicomponent liquid compositions. The machine learning spectral data analyzer may be trained for a desired plurality of components of the multicomponent liquid composition to be subjected to spectroscopic evaluation by the spectroscopic evaluation system over identified concentration ranges for each of the plurality of components.

One aspect of this disclosure provides a chemical processing system, comprising:
  chemical processing equipment with fluid containment space to contain the multicomponent liquid composition during chemical processing; and
  the spectroscopic evaluation system;
  wherein the liquid contact probe is disposed in fluid communication with the fluid containment space to contact the multicomponent liquid composition for the spectroscopic investigation when the fluid containment space contains the multicomponent liquid composition.

Another aspect of this disclosure provides a chemical processing method using such a chemical processing system, the method comprising:
  in such a chemical processing system, performing the chemical processing; and
  during the chemical processing, performing the spectroscopic evaluation on the multicomponent liquid composition in the fluid containment space.

One aspect of this disclosure provides a method for spectroscopic evaluation of a multicomponent liquid composition, the method comprising:
  contacting a multicomponent liquid composition with a liquid contact probe of a spectroscopic evaluation system and through the liquid probe subjecting the multicomponent liquid composition to spectroscopic investigation with a spectroscopic stimulation energy transmitted through the liquid contact probe;
  detecting spectroscopic response energy resulting from the spectroscopic investigation and generating spectral data corresponding to the detected spectroscopic response energy;
  trained machine learning evaluation of the spectral data by a machine learning spectral data analyzer of a spectroscopic evaluation system to determine a concentration value for each one of a plurality of components of the multicomponent liquid composition, wherein the machine learning spectral data analyzer is trained for each said component of the plurality of components over a corresponding trained concentration range for the said component and is trained for temperature effect on the spectral data over a trained temperature range, wherein each said concentration value is a temperature-compensated value.

Another aspect of this disclosure provides a chemical processing method, with chemical processing including performing such spectroscopic evaluation method, wherein such chemical processing may comprise:
  feeding a reactant fluid to a reaction vessel containing at least one chemical reactant;
  chemically reacting in a fluid reaction mixture in the reaction vessel a said reactant and forming in the reaction vessel at least one reaction product;
  removing from the reaction vessel a product fluid comprising a said reaction product; and subjecting a liquid portion of at least one of the reactant fluid, the reaction fluid mixture and the product fluid to such a method for spectroscopic evaluation.

A number of feature refinements and additional features are applicable to any one or more of these or other aspects of the disclosure. These feature refinements and additional features may be used individually or in any combination within the subject matter of any such aspects. As such, each of the following features may be, but are not required to be, used with any other feature or combination of features in relation to the same aspect or any other aspect of the disclosure.

Some feature refinements and additional features may be applicable to the spectroscopic evaluation system and/or methods involving spectroscopic evaluation, which may use such a spectroscopic evaluation system.

The machine learning spectral data analyzer may be trained for temperature effect on the spectral data over a trained temperature range to provide a temperature-compensated value for the concentration value of each said component for different temperatures across the full range of the trained temperature range.

The machine learning spectral data analyzer may include a support vector machine, and methods may include support vector machine processing, to evaluate the spectral data and determine the concentration values and/or temperature values. As used herein, a support vector machine component of a spectral data analyzer includes a trained support vector machine model, and support vector machine processing includes operation of such a support vector machine model, that performs trained support vector analysis of spectral data in the machine learning spectral data analyzer. Such support vector analysis may be or include support vector regression analysis and/or support vector classification analysis. Such a support vector machine may include a radial bias function kernel. Such a support vector machine may comprise a soft margin set at least in part through a soft-margin constant. The machine learning spectral data analyzer may include a neural network, and methods may include neural network processing, to evaluate the spectral data and to determine the concentration values and/or temperature values. The machine learning spectral data analyzer may be trained on at least 3, at least 4 or at least 5 components of the liquid composition. The machine learning spectral data analyzer may be trained on any number of components, and in some implementations such number may be up to 10 components, up to 8 components or up to 6 components of the liquid composition. When the machine learning spectral data analyzer is trained for temperature effect on the spectral data over a trained temperature range. The trained temperature range may span any desired temperature rang. Such a trained temperature range may span at least 3° C., at least 5° C., at least 8° C., at least 10° C., at least 15° C., at least 20° C., at least 25° C., at least 30° C., at least 40° C. or at least 50° C. Such a temperature range may sometimes span no more than 200° C., no more than 175° C., no more than 150° C. no more than 125° C., no more than 100° C., no more than 80° C., no more than 70° C. or no more than 60° C. Such a trained temperature range may have any upper and lower limits desired. In some implementations, such a temperature range may have a lower limit of −20° C., −10° C., 0° C., 5° C., 10° C., 15° C., 20° C., 25° C., 30° C., 40° C., 50° C., 75° C. or 100° C. or higher. In some implementations, such a trained temperature range may have an upper limit of 300° C., 250° C., 200° C., 175° C., 150° C., 125° C., 100° C., 80° C., 70° C. or 60° C.

The spectroscopic investigation may involve any spectroscopic investigation technique, using any spectroscopic stimulation energy. In some implementations, the spectroscopic stimulation energy may be provided as electromagnetic radiation. In some implementations, the spectroscopic investigation may include an infrared spectroscopic investigation, with spectroscopic stimulation energy, and optionally also spectroscopic response energy, including electromagnetic radiation in the infrared range. In some implementations, electromagnetic radiation of the spectroscopic stimulation energy and/or the spectroscopic response energy may span a wave number range across at least 100, 200, 300, 500, 700, 1000 or 2000 $cm^{-1}$ wave numbers, which may in some implementations be in or include a portion of the infrared range, which may for example be in or include a portion of the near infrared range or the mid infrared range or any other portion of the infrared range. As may be appreciated, a wave number (also identified herein as a wavenumber) is a unit often expressed in $cm^{-1}$ units that is a reciprocal value to wavelength. As may be appreciated a wave number corresponds with a number of wavelengths per unit distance (e.g., per centimeter). As such, a large wave number corresponds with a short wavelength and a small wave number corresponds with a long wavelength. Such electromagnetic radiation of spectroscopic stimulation energy and/or spectroscopic response energy may span a wave number range having a lower limit of 200 $cm^{-1}$, 300 $cm^{-1}$, 400 $cm^{-1}$, 600 $cm^{-1}$, 800 $cm^{-1}$, 1000 $cm^{-1}$. Such electromagnetic radiation of spectroscopic stimulation energy and/or spectroscopic response energy may span a wave number range having an upper limit of 10,000 $cm^{-1}$, 6,000 $cm^{-1}$, 5,000 $cm^{-1}$, 4,000 $cm^{-1}$, or 3,500 $cm^{-1}$. Such a range may span a wave number range across at least 1000 wave numbers of the infrared spectrum. Spectral data may have a resolution across an electromagnetic radiation wavenumber range no larger than 10 $cm^{-1}$, 8 $cm^{-1}$, 6 $cm^{-1}$, 5 $cm^{-1}$, 4 $cm^{-1}$, 3 $cm^{-1}$, 2 $cm^{-1}$ or 1 $cm^{-1}$. Such a range may often have such a resolution that is at least 0.5 $cm^{-1}$.

A spectroscopic evaluation system may include a plurality of the liquid contact probes each connected with a different one of a plurality of said spectrometers. A machine learning spectral data analyzer may be connected with each said spectrometer of the plurality of said plurality of said spectrometers. A machine learning spectral data analyzer may include an electronic processor and non-volatile memory with stored instructions executable by the electronic processor to perform trained machine learning evaluation of the spectral data and determine the concentration values and/or temperature.

In some implementations, the liquid probe may be or include an attenuated total reflectance (ATR) probe. The liquid probe may be disposed to contact the multicomponent liquid in a flowing stream for the spectroscopic investigation. The liquid probe may be disposed to contact the multicomponent liquid under processing conditions where the temperature of the multicomponent liquid varies over a temperature range, which may span any range of temperatures, for example any of the temperature ranges described elsewhere herein for a trained temperature range. The spectrometer may be or include any type of spectrometer compatible with the spectroscopic response energy, and in some implementation may be or include a Fourier transform-infrared (FT-IR) spectrometer. The energy source may be any energy source for providing the desired spectroscopic stimulation energy, and in some implementations may comprises an electromagnetic radiation source.

In some implementations, the machine learning spectral data analyzer is configured to determine a value for the temperature of the multicomponent liquid composition. Just as a machine learning spectral data analyzer may be trained to compensate for temperature in concentration value determinations, the machine learning spectral data analyzer may also be trained to determine values of temperature of the multicomponent liquid composition across the full range of the trained temperature range.

Some feature refinements and additional features may be applicable to chemical processing systems and/or chemical processing methods, which may use such chemical processing systems, whether or not involving carbon dioxide capture in an amine-based scrubbing solution.

When spectroscopic evaluation is performed in a fluid containment space of chemical processing equipment, such chemical processing equipment may in some implementations include any one or more of the following:

a process vessel with an internal volume to contain process fluids for a chemical process operation during chemical processing, the process vessel comprising a fluid inlet to input a feed of process fluid into the internal volume of the process vessel and a fluid outlet to output an effluent fluid from the internal volume of the process vessel;

a first fluid communication path to conduct the feed of process fluid to the inlet; and a second fluid communication path to conduct the effluent of process fluid way from the fluid outlet. The liquid contact probe may be configured to contact the multicomponent liquid composition in a location in the internal volume of the process vessel, in the first fluid communication path or in the second fluid communication path. In some variations, multiple liquid contact probes may be provided each disposed at a different location in fluid communication with different portions of the fluid containment space of chemical processing equipment, and disposed to contact different multiphase liquid compositions at those different locations, which may or may not be of the same composition or in the same processing stream, process vessel of fluid communication path. In some variations, a process vessel may be a reaction vessel for chemical reaction processing including chemical reactions and a liquid contact probe may be disposed to contact a multiphase liquid composition in the volume of the reaction vessel (e.g., to monitor steady state or transitory reaction conditions), in a feed stream containing at least one chemical reactant and/or in an effluent stream including a reaction product. A liquid contact probe may be disposed to perform a spectroscopic evaluation on a reaction mixture undergoing the reaction processing during which a chemical reactant is consumed and a reaction product is generated and spectroscopic evaluation may include determining concentrations of the chemical reactant and the reaction product in a dynamically reacting mixture or in a reaction product stream. Such chemical reaction processing may also be evaluated for a reaction product that is a reaction byproduct, which may represent an undesired contaminant.

The spectroscopic evaluation system may be used in continuous, semi-continuous, batch or other chemical processing systems and operations. In batch chemical processing, commencement or discontinuance of batch processing, or addition of a reactant or reagent to the batch, may be based, at least in part, on monitored properties in a batch processing reaction vessel. For example, spectroscopic evaluation may be performed multiple times at different times during the batch processing to monitor changes in a reaction mixture over time during the batch chemical processing. Such monitored conditions may form a basis for altering the batch processing conditions (e.g., adding a reactant or reagent to the batch, changing the temperature of the batch or discontinuing batch processing).

A spectroscopic evaluation may be part of or used in combination with process control operation. A chemical processing system or method may include use of a process controller in communication connection with manipulable process equipment manipulable at the direction of the process controller to change at least one operating parameter of the chemical processing system or method based on process evaluation criteria including at least in part results of such spectroscopic evaluation, for example determined concentration values for one or more components and/or liquid composition temperature. Such manipulable process equipment may include one or more control valves operable at the direction of the process controller to change a flow rate of a fluid stream in the chemical processing system. Such control valves may change flow rates (including starting or stopping flows) of process fluid streams or heat exchange fluid streams to heat exchange units (e.g., a heating unit or a cooling unit). The process control may manipulate the flow of a monitored fluid stream or may manipulate flow of a different fluid stream.

A method may include performing, or a spectroscopic evaluation system may be configured to perform, periodic automated evaluation of operating performance of the chemical processing by an automated process evaluation system based on process evaluation parameters including the determined concentration values. Based on such an evaluation, at least one operating parameter of chemical processing may be changed. Changing an operating parameter may include automatic generation by a process controller of control signals directed to manipulable process equipment to accomplish the changing at least one operating parameter. Such manipulable process equipment may include at least one control valve.

Some feature refinements and additional features may be applicable more particularly to chemical processing systems and/or chemical processing methods involving carbon dioxide capture using amine-based scrubbing solutions.

An amine-based scrubbing solution, and a plurality of components of such a solution, may comprise one or more amine compound for carbon dioxide capture. Such a scrubbing solution may include at least one amine component, or at least two amine components, selected from the group consisting of monoethanolamine, diethanolamine, N-methylethanolamine, diisopropanolamine, aminoethoxyethanol (diglycolamine), 2-amino-2-methylpropanol (also known as 2-amino-2-methyl-1-propanol; 2-amino-2-methyl-propan-1-ol; an aminomethyl propanol; isobutanol-2-amine; aminoisobutanol and AMP), benzylamine, methyl diethanolamine, a substituted benzylamine and piperazine. The scrubbing solution may be an aqueous solution, with water present in the largest molar concentration.

Numerous additional features and advantages of the present disclosure will become apparent to those skilled in the art upon consideration of the embodiment descriptions provided herein below.

DETAILED DESCRIPTION

Figure 1:
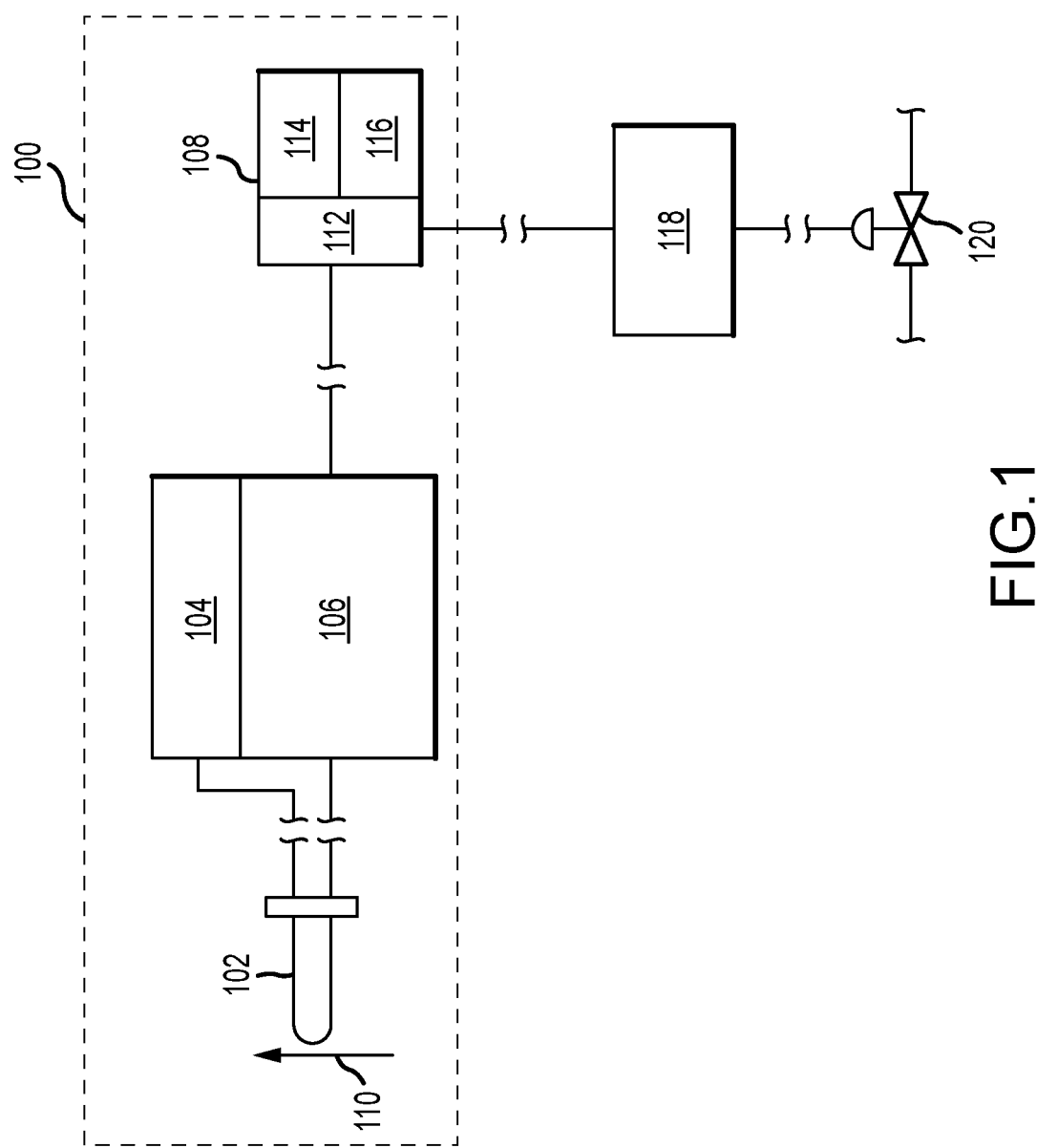
FIG. 1 illustrates an example embodiment of a spectroscopic evaluation system.

Reference is made to FIG. 1. FIG. 1 illustrates a spectroscopic evaluation system 100 for spectroscopically evaluating selected properties (e.g., concentrations of multiple components in a multicomponent liquid composition and/or temperature of the multicomponent liquid composition). As shown in FIG. 1, the spectroscopic evaluation system 100 includes a liquid contact probe 102, an energy source 104, a spectrometer 106 and a machine learning spectral data analyzer 108. The liquid contact probe 102 may contact a multicomponent liquid composition for spectroscopic investigation of such a multicomponent liquid composition. For illustration purposes, a flowing stream 110 of such a multicomponent liquid composition is shown flowing by the liquid contact probe 102. The energy source 104 is connected with the liquid contact probe 102 to provide spectroscopic stimulation energy to the liquid contact probe 102 to interact with the multicomponent liquid composition for the spectroscopic investigation. The liquid contact probe 102 is also connected with the spectrometer 106 to provide resulting spectroscopic response energy generated by the spectroscopic investigation of the multicomponent liquid composition to the spectrometer 106 for processing of the spectroscopic response energy. The energy source 104 may include a source for generating electromagnetic radiation spanning a desired wave number range for purposes of the spectroscopic investigation. In some implementations, the energy source 104 may generate electromagnetic radiation spanning a wave number range in or including a portion of the infrared spectrum. The energy source 104 may be a broad-band source providing electromagnetic radiation over a relatively large spectral range within the infrared spectrum. Such a light source may, for example, include one or more lamps, filament emitters and/or other electromagnetic radiation generating componentry. The liquid contact probe 102 may be any probe design to transmit the spectroscopic stimulation energy to interact with the multicomponent liquid composition in contact with the liquid contact probe to perform the desired spectroscopic investigation. In some preferred implementations, the liquid contact probe 102 may be configured for attenuated total reflectance (ATR) interaction with the multicomponent liquid composition, and the liquid contact probe 102 may be an ATR probe. The spectrometer 106 may for example, perform infrared spectroscopy, which may be Fourier transform infrared (FT-IR) spectroscopy. As may be appreciated, a number of commercial spectroscopy products are available, including for FT-IR spectroscopy, in which an energy source and spectrometer are combined into a single unit, often referred to as a spectrometer product. As used herein, spectrometer refers to the portion of such units that perform the processing on spectroscopic response energy. Such processing may include, for example, separating response electromagnetic radiation into discrete spectral portions (e.g., using prisms or grating) and detecting the discrete spectral portions to determine spectral characteristics of the response radiation and to generate spectral data corresponding to the spectral attributes of the response radiation. Such spectral data may, for example, be in the form of electronic signals that may be provided to the machine learning spectral data analyzer 108 for evaluation of the spectral data to determine values for preselected properties of the multicomponent liquid composition (e.g., concentrations of components and/or temperature of the multicomponent liquid composition) for which the machine learning spectral data analyzer 108 has been trained. In some preferred implementations, the spectrometer 106 will be an FT-IR spectrometer. A variety of detectors (e.g., linear arrays, charge coupled devices (CCDs), back-thinned charge coupled devices (BT-CCDs), photodiode arrays (PDAs)) are used in spectrometers and any detector configuration may be used to detect the spectroscopic response energy and provide the output spectral data in a form (e.g., electronic signals) for transmission to the machine learning spectral data analyzer 108. The machine learning spectral data analyzer 108 is configured to receive and evaluate the spectral data to determine values for the selected properties for which the machine learning spectral data analyzer 108 has been trained. In the illustrated example of FIG. 1, the machine learning spectral data analyzer 108 has a processor 112 (e.g., an electronic computer processor), non-volatile memory 114 (e.g., disk or solid-state storage) and a user interface 116. The user interface may, for example include a video display monitor and may include user manipulable input features (e.g., keyboard, mouse, touchpad, touch screen). The non-volatile memory 114 may have stored instructions (e.g., computer software instructions) executable by the processor 112 to perform the evaluation of the spectral data to determine the selected properties of the multicomponent liquid composition.

With continued reference to FIG. 1, determined values for the selected properties may provide information to a user as to whether a chemical process is operating inside or outside of desired operating parameters. Such information may be used to evaluate chemical process performance. Such information may also be used for chemical process control purposes. In the illustration shown in FIG. 1, the machine learning spectral data analyzer 108 is connected to a process controller 118 (e.g., electronic controller), which may be configured to evaluate process performance evaluation criteria which may include a comparison of one or more of the determined properties from the machine learning spectral data analyzer 108 relative to preselected operating criteria. Based on such an evaluation, the process controller 118 may as appropriate generate control signals and direct such control signals to manipulable process equipment to change one or more operating parameters of the chemical process system. In the illustration of FIG. 1, the process controller 118 is connected to a process control valve 120 that may be manipulated at the direction of the process controller to open and close the process control valve 120 to change the flow of a fluid stream through the process control valve 120.

As may be appreciated, various connections between componentry may be provided in a variety of manners. For example, signal connections, such as may be provided between the spectrometer 106 and the machine learning spectral data analyzer 108 or between the machine learning spectral data analyzer 108 and the process controller 118 may include wired and/or wireless connections. Connections between the liquid contact probe 104 and the energy source 104 and the spectrometer 106 may involve various optical componentry, and may involve transmission of electromagnetic radiation through electromagnetic-transmitting conduits (e.g., optical fibers, waveguides).

As shown in the illustration of FIG. 1, the process controller 118 is shown as a separate unit from the machine learning spectral data analyzer 108. As may be appreciated, the features of such a process controller 118 and machine learning spectral data analyzer 108 may be combined into a single unit, for example a single computing unit. For example, the data analyzer 108 could include instructions stored in the nonvolatile memory 114 executable by the processor 112 to perform process control evaluations and to transmit control signals to operate manipulable process equipment, such as the process control valve 120.

Figure 2:
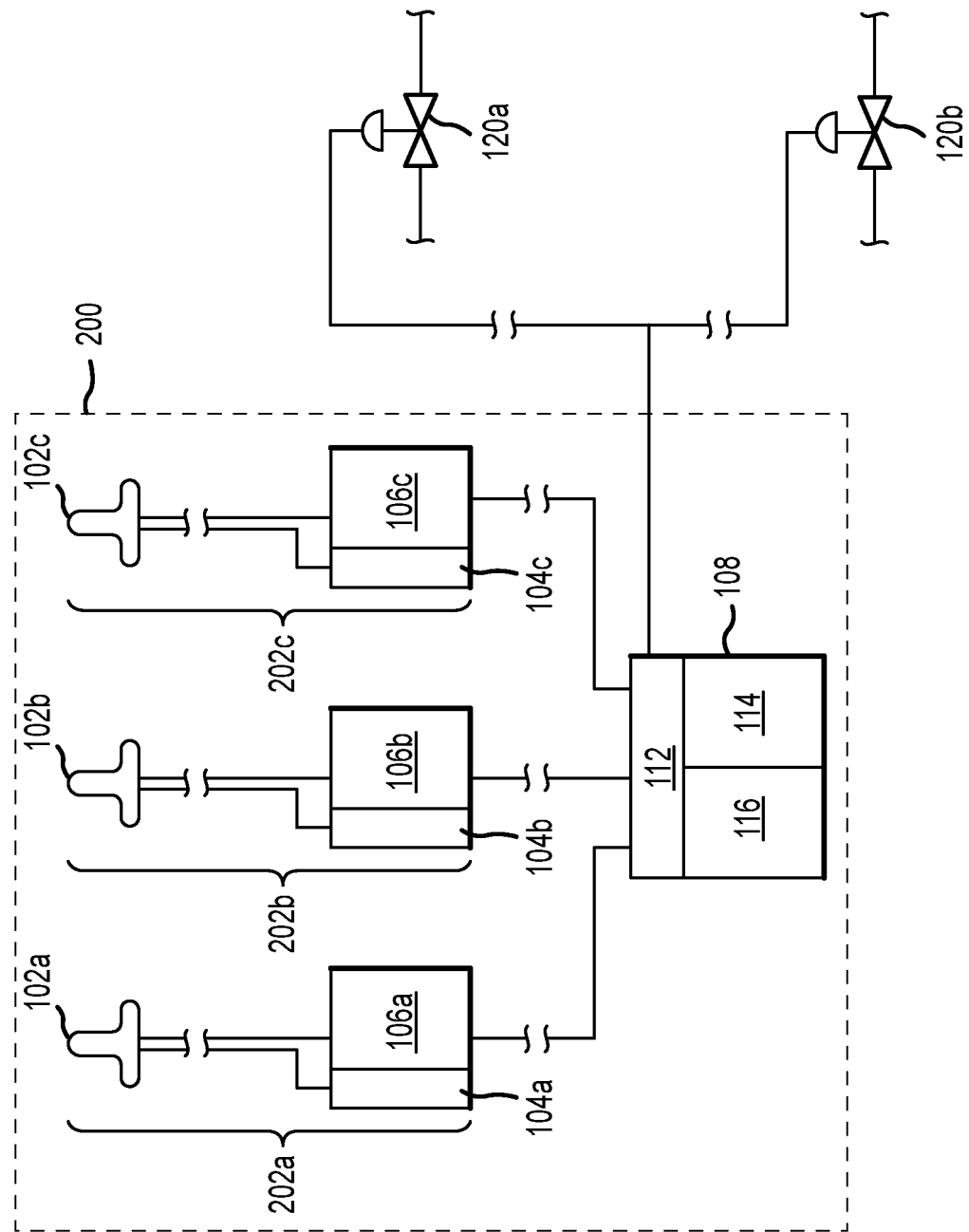
FIG. 2 illustrates another example embodiment of a spectroscopic evaluation system.

Reference is now made to FIG. 2, which illustrates another embodiment for a spectroscopic evaluation system. As shown in FIG. 2, the illustrated spectroscopic evaluation system 200 includes spectroscopic investigation units unit 202a,b,c each including a combination of a liquid contact probe 102a,b,c, light source 104a,b,c and spectrometer 106a,b,c for performing spectroscopic investigations at various locations in a chemical processing system. The liquid contact probes 102a,b,c, the light sources 104a,b,c, and the spectrometers 106a,b,c may be or have features as described for such corresponding elements shown and described in relation to FIG. 1. Such various locations may be for investigating a multicomponent liquid composition at different locations within a chemical process system (e.g., monitoring a process stream at different locations along a flow path) or may correspond with investigating different multicomponent liquid compositions (e.g., different process streams). The spectroscopic evaluation system 200 includes a single machine learning spectral data analyzer 108 connected with all of the spectrometers 106a,b,c to receive and evaluate spectral data generated by each of the spectrometers 106a,b,c from corresponding spectroscopic investigations performed at the different locations of the liquid contact probes 102a,b,c. The machine learning spectral data analyzer 108 may be configured to perform control functions. The machine learning spectral data analyzer 108 may be configured to selectively periodically direct each of the spectroscopic investigation units 202a,b,c to perform spectroscopic investigations at the different locations of the liquid contact probes 102a,b,c as desired for process monitoring and/or process control purposes. The machine learning spectral data analyzer 108 shown in FIG. 2 may be configured to perform as a process controller that in addition to controlling operation of the spectrometer units 102a,b,c also generates control signals to direct manipulation of two example control valves 120a,b located at different locations in a chemical processing system.

Figure 3:
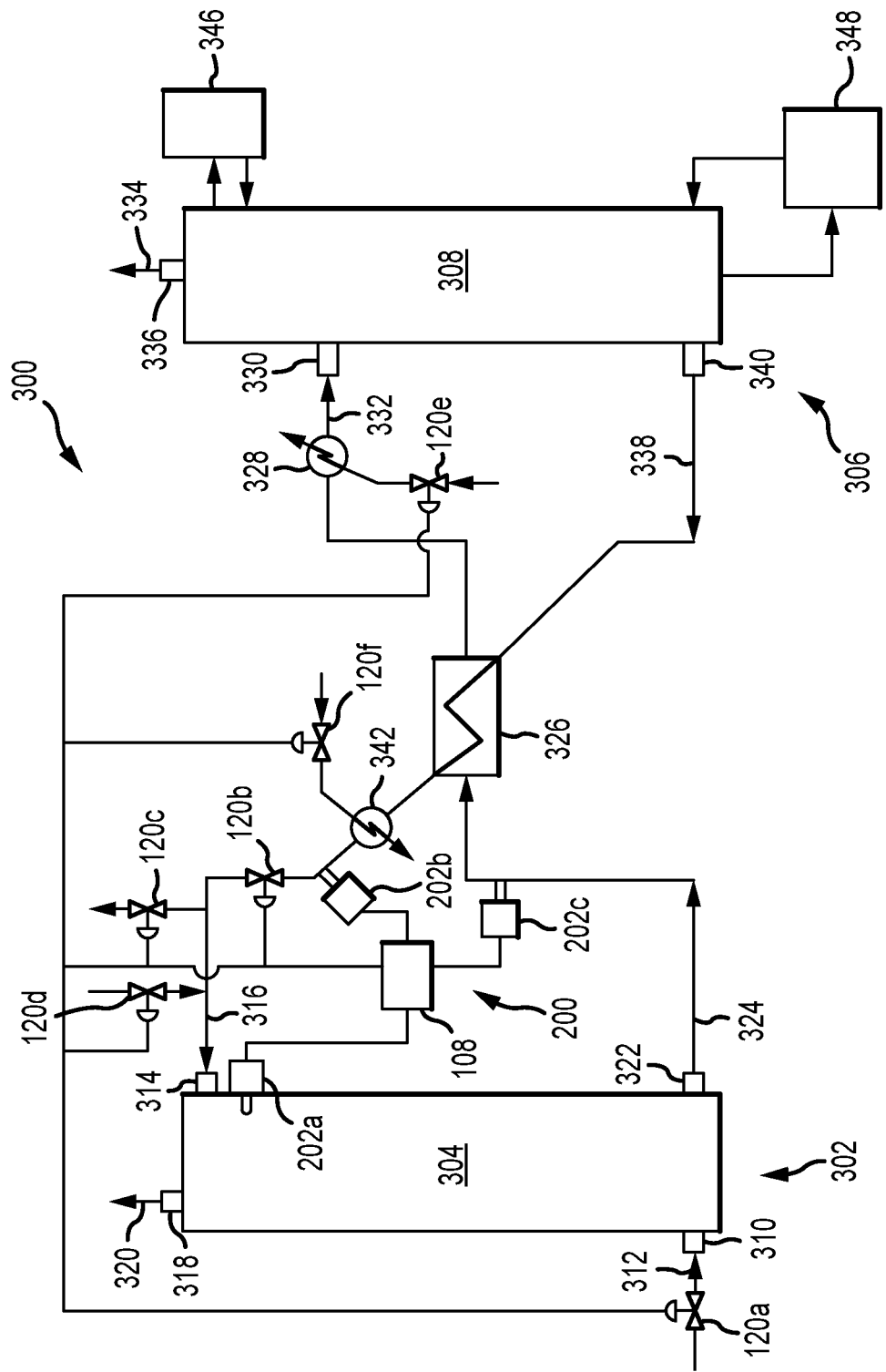
FIG. 3 illustrates an example chemical processing system for removing carbon dioxide from a carbon dioxide-containing gas mixture using an amine-based scrubbing solution.

Reference is now made to FIG. 3 illustrating an example chemical processing system, which in the example of FIG. 3 is a chemical processing system for capturing carbon dioxide from a carbon dioxide-containing gas mixture using an amine-based scrubbing solution that is a multicomponent liquid composition including water, at least one amine component for carbon dioxide capture and captured carbon dioxide. As shown in FIG. 3, a carbon dioxide capture system 300 includes a carbon dioxide scrubbing unit 302 including a first process vessel illustrated in the form of a scrubbing column 304 and the carbon dioxide capture system 300 includes a scrubbing solution regeneration unit 306 including a second process vessel illustrated in the form of a stripping column 308.

As shown in FIG. 3, the scrubbing unit 302 includes a first gas inlet 310 for input of a gas feed stream 312 of a carbon dioxide-containing gas mixture into the scrubbing column 304. The scrubbing unit 302 includes a first liquid inlet 314 for input of a liquid feed stream 316 with lean scrubbing solution to contact the gas mixture in the scrubbing column 304 to remove carbon dioxide from the gas mixture for capture of the carbon dioxide in the scrubbing solution. The scrubbing unit 302 includes a first gas outlet 318 to output a treated gas stream 320 of the gas mixture that has been largely cleansed of carbon dioxide, and may have a significantly lower concentration of carbon dioxide than the gas feed stream 312. The scrubbing unit 302 also includes a first liquid outlet 322 to output a liquid effluent stream 324 with rich scrubbing solution loaded with carbon dioxide, and which may have a much higher concentration of captured carbon dioxide than in the liquid feed stream 316.

The rich scrubbing solution of the liquid effluent stream 324 is heated in a first heat exchanger 326 and further heated in a second heat exchanger 328 to increase the temperature of the stream for input to the regeneration unit 306 through a second liquid inlet 330 as a liquid feed stream 332 to the stripping column 308. In the stripping column 308, carbon dioxide is released from the scrubbing solution and a purified carbon dioxide gas stream 334 is removed from the stripping column 308 as a gas effluent stream through a gas outlet 336. A liquid effluent stream 338 with lean scrubbing solution from which most of the captured carbon dioxide has been removed is removed from the stripping column 308 through a second liquid outlet 340. The lean scrubbing solution in the liquid effluent 338 is cooled in the first heat exchanger 326 and then further cooled in a third heat exchanger 342 to a reduced temperature as desired for input into the scrubbing column 304 with the liquid feed stream 316. The fluid communication path for the lean scrubbing solution from the second liquid outlet 340 through the first heat exchanger 326 and the third heat exchanger 342 to the first liquid inlet 314 provides a first fluid communication path between the scrubbing unit 302 and the regeneration unit 306. The fluid communication path for the rich scrubbing solution from the first liquid outlet 322 through the first heat exchanger 326 and the second heat exchanger 328 to the second liquid inlet 330 provides a second fluid communication path between the scrubbing unit 302 and the regeneration unit 306.

In the processing shown in FIG. 3, the scrubbing column 304 is typically operated at a lower temperature than the regeneration column 308. Temperatures in the scrubbing column 304 for example may often be in a range of from 25° C. to 70° C. and temperatures in the regeneration column 308 may for example often reach 100° C. or higher. Supplemental heating and/or cooling may be provided at various points in the carbon dioxide capture system 300 in addition to the illustrated heat exchangers. In the example shown in FIG. 3, supplemental heat is supplied to the stripping column 308 by a reboiler 344 that heats and returns to the stripping column 308 at least a portion of column bottoms. Also shown in the example of FIG. 3, a condenser 346 cools fluid circulated from a top portion of the stripping column 308 to condense scrubbing solution for return to the regeneration column 308.

With continued reference to FIG. 3, the carbon dioxide capture system 300 includes a process monitoring and control system including an example of the spectroscopic evaluation system described herein. For illustration purposes, the carbon dioxide capture system 300 is shown including the spectroscopic evaluation system 200 shown in and described in relation to FIG. 2. As shown in FIG. 3, the spectroscopic evaluation system 200 includes the spectroscopic investigation units 202a,b,c located to perform spectroscopic investigations at different locations within the carbon dioxide capture system 300. The machine learning spectral data analyzer 108 is connected with each of the spectroscopic investigation units 202a,b,c. A first spectroscopic investigation unit 202a has its liquid contact probe positioned inside the scrubbing column 304 to permit spectroscopic investigations to be performed directly on scrubbing solution passing through the interior volume of the scrubbing column 304 during a carbon dioxide scrubbing operation. A second spectroscopic investigation unit 202b has its liquid contact probe positioned to contact lean scrubbing solution passing through the first fluid communication path downstream of the third heat exchanger 342. A third spectroscopic investigation unit 202c has its liquid contact probe positioned to contact rich scrubbing solution passing through the second fluid communication path upstream of the first heat exchanger 326. The machine learning spectral data analyzer 108 may periodically direct that spectroscopic investigations be performed at the different locations of the spectroscopic investigation units 202a,b,c to monitor performance of the carbon dioxide capture system 300 during carbon dioxide capture processing. Such monitoring may include determining temperature-compensated concentration values for components of the scrubbing solution (e.g., amine component or components, captured carbon dioxide, water) and/or determining the temperature of the scrubbing solution at various times and at the various locations of the different spectroscopic investigation units 202a,b,c. The machine learning spectral data analyzer 108 may output information to a user for use in evaluating performance of the carbon dioxide capture system. The machine learning spectral data analyzer 108 may also record on non-volatile memory, or may transmit to a remote location, determined values for the various selected properties evaluated by the machine learning spectral data analyzer. As may be appreciated, through comparison of determined concentration values for captured carbon dioxide in the lean scrubbing solution relative to the rich scrubbing solution, carbon capture efficiency may be evaluated. Also, the scrubbing solution may be monitored for chemical composition changes indicating undesirable formation or buildup of degradation products (e.g., nitrosamines), either through direct monitoring for the concentration of one or more degradation products or through monitoring changes over time in the concentration of amine components indicating a loss of the amine components as degradation occurs. The scrubbing solution may also be monitored for undesirable buildup or loss of water, such as through water vapor introduction as part of the gas feed stream 312 or through water vapor removal with the treated gas stream 320 and/or the purified carbon dioxide gas stream 334. Based on such monitored properties, process controller functions incorporated with the machine learning spectral data analyzer may be used to generate control signals to manipulate a variety of manipulable process equipment. In the illustration of FIG. 3, an example of six flow control valves 120a-f are shown at various locations in the carbon dioxide capture system 300 and connected with the machine learning spectral data analyzer 108. In the example shown in FIG. 3, a first flow control 120a valve may be manipulated to change the feed rate of the gas feed stream 312 to the scrubbing column 304, a second flow control valve 120b may be manipulated to change the feed rate of the liquid feed stream 316 with lean scrubbing solution to the scrubbing column 304. The first and second flow control valves 120a and 120b may, therefore, be manipulated to achieve a desired gas-to-liquid (or liquid-to-gas) ratio within the scrubbing column 304. As shown in FIG. 3, a third flow control valve 120c may be manipulated to bleed a portion of the scrubbing solution from the first fluid communication path, for example as appropriate to prevent undesirable buildup of degradation products, and a fourth flow control valve 120d may be manipulated to add fresh scrubbing solution as appropriate to make up for losses in the system or to balance against scrubbing solution bleed. Similar features could also be included to selectively introduce additional water into the scrubbing solution is desired. Illustrated fifth and sixth process control valves 120e,f are manipulable to control flow of heat exchange fluid to the second heat exchanger 328 and the third heat exchanger 342, respectively, to control a rate of heat exchange in those heat exchangers. As illustrated in FIG. 3 the machine learning spectral data analyzer 108 is part of an overall process control system, and the machine learning spectral data analyzer 108 is configured to function as or to be a part of a process controller. As may be appreciated, in alternative implementations the machine learning spectral data analyzer 108 may function separately from some or all process control functions. For example, the machine learning spectral data analyzer 108 may control operation of the spectroscopic investigation units 202a,b,c and may provide information on determined values of selected properties to a separate process controller (similar to as shown in FIG. 1) that may perform process control functions. As another example, such a separate process controller could both direct operation of the spectroscopic investigation units 202a,b,c and direct overall process control while the machine learning spectral data analyzer 108 is dedicated to evaluating spectral data from the spectroscopic investigation units 202a,b,c and providing information on determined values to a separate process controller.

As may be appreciated, FIG. 3 is of a general nature to illustrate some particular processing features. The carbon dioxide capture system 300 is illustrated in FIG. 3 as including only a single scrubbing vessel and only a single regeneration vessel. In alternative implementations, the carbon dioxide capture system 300 may include multiple scrubbing vessels and/or multiple regeneration vessels, which may for example be arranged for parallel or series operation. Various implementations of the carbon capture system 300 illustrated in FIG. 1 may include processing equipment/and or processing unit operations in addition to or modified from those illustrated in FIG. 3. For example additional equipment or operations may be included upstream of the scrubbing unit 302 to dry, pre-cool or otherwise prepare or condition a gas mixture to provide the gas feed stream 312, may be included in connection with operation of the scrubbing column 304, may be included in connection with operation of the stripping column 308, may be included between the scrubbing unit 302 and the regeneration unit 306, may be included to further treat the treated gas stream 320 and/or may be included to further treat the purified carbon dioxide gas stream 334. In some alternative examples, the scrubbing unit 302 and/or the stripping column 304 may include multiple feeds of carbon dioxide-containing gas mixture for scrubbing to remove carbon dioxide, for example with different gas feed streams introduced at different elevations in the scrubbing column 304.

Machine learning data analysis performed by the machine learning spectral data analyzer 108 may be based on any machine learning model, with an artificial neural network (ANN) and a support vector machine (SVM) being preferred for machine learning models for the machine learning spectral data analyzer 108. Artificial neural networks and support vector machines are well known machine learning data analysis approaches. An artificial neural network is a connectionist approach with interconnected networks of constitutive computational units, which may be referred to as neural units. Artificial neural network approaches have an advantage that artificial neural networks may be applied to deep learning techniques with many depths of network layers.

A particularly preferred machine learning data analysis model for the machine learning spectral data analyzer 108 is a support vector machine to perform support vector regression analysis of spectral data. Support vector machines are kernel methods in which a kernel function is used to transform data that is non-linearly separable from input space to feature space where more simplified analysis techniques may be used, for example to a high-dimensional space where linear decision surfaces may be applied. As may be appreciated, a kernel function is a function that corresponds to an inner product in some expanded feature space. If data points are mapped into high-dimensional space via a transformation $\Phi: x \rightarrow \varphi(x)$, the inner product becomes: $K(x_i, x_j) = \varphi(x_i) \varphi(x_j)$, where K represents the kernel function. A variety of kernel functions are used in support vector machine models, including linear, polynomial and radial bias function kernels. For some implementations, the radial bias function kernel (also referred to as a Gaussian kernel) is preferred for use with support vector machine models in the machine learning spectral data analyzer 108. The radial bias function kernel may be represented as:

$$K(x,x') = \exp(-\gamma \|x - x'\|^2)$$

where x and x' represent feature vectors for two samples in an input space, and the gamma parameter is as follows:

$$\gamma = 1/2\sigma^2$$

Where $\sigma$ is a free parameter. In classification margin determination, providing for some margin violation through soft margin techniques may enhance performance in a practical sense through a combination of accuracy with robustness, compared to application of a hard margin. In margin determination, margin violations may be permitted to some degree with assignment of a penalty, using so-called slack variables $\epsilon_i$, representing magnitude of margin violation. Using such a slack variable approach, the soft margin fit may optimize around permitted margin violations, such as finding w and b such that $\Phi(w) = 1/2 w^T w + C \Sigma \epsilon_i$ is minimized and for all
$\{(x_i, y_i)\} y_i (w^T x_i + b) \geq 1 - \epsilon_i$ and $\epsilon_i \geq 0$ for all $i$ where w is a vector normal to the hyperplane, $w^T$ is the transpose of w, C is a constant and b is the y-intercept of the hyperplane.

A method for developing an SVM model trained for selected parameters (e.g., concentration and/or temperature) for a particular compositional system is to first obtain spectral data samples for actual test compositions by preparing those test compositions with known concentrations of selected components, subjecting the test compositions to spectroscopic investigation and generating spectral data for each of the test compositions to be used as training data for developing the support vector machine model.

Using an SVM approach such as summarized above with a soft margin, the SVM parameters of gamma ($\gamma$) and C are of critical importance and careful selection is important for a robust and accurate model. Gamma represents how far a single training example influences the model with low values having a far influence and high values having a close influence. The gamma parameter may be seen as the inverse of the radius of influence of sample selected by the model as support vectors. The other SVM parameter C may be referred to as a soft margin constant. A larger value of C corresponds to a large penalty to errors/margin errors while smaller value of C corresponds to a small penalty to errors/margin errors. By adjusting C, the effects that outliers or miscalculations have to the model can be modified. If the C parameter is too large, the model will not be able to analyze data that does not look exactly or almost exactly like the training data. Conversely, if the C parameter is too small it will over-fit the data as the penalty for poor fitting is small. As may be appreciated, one technique to help find optimal values for the gamma and C parameters is to use a differential evolution algorithm. Values for gamma and C may be simultaneously changed based on the differential evolution algorithm. In one technique, average mean squared error from a many-fold (e.g., 10-fold) cross validation may be used for such an optimization. The differential evolution algorithm achieves its solution when the change in mean squared error becomes small.

Figure 4:
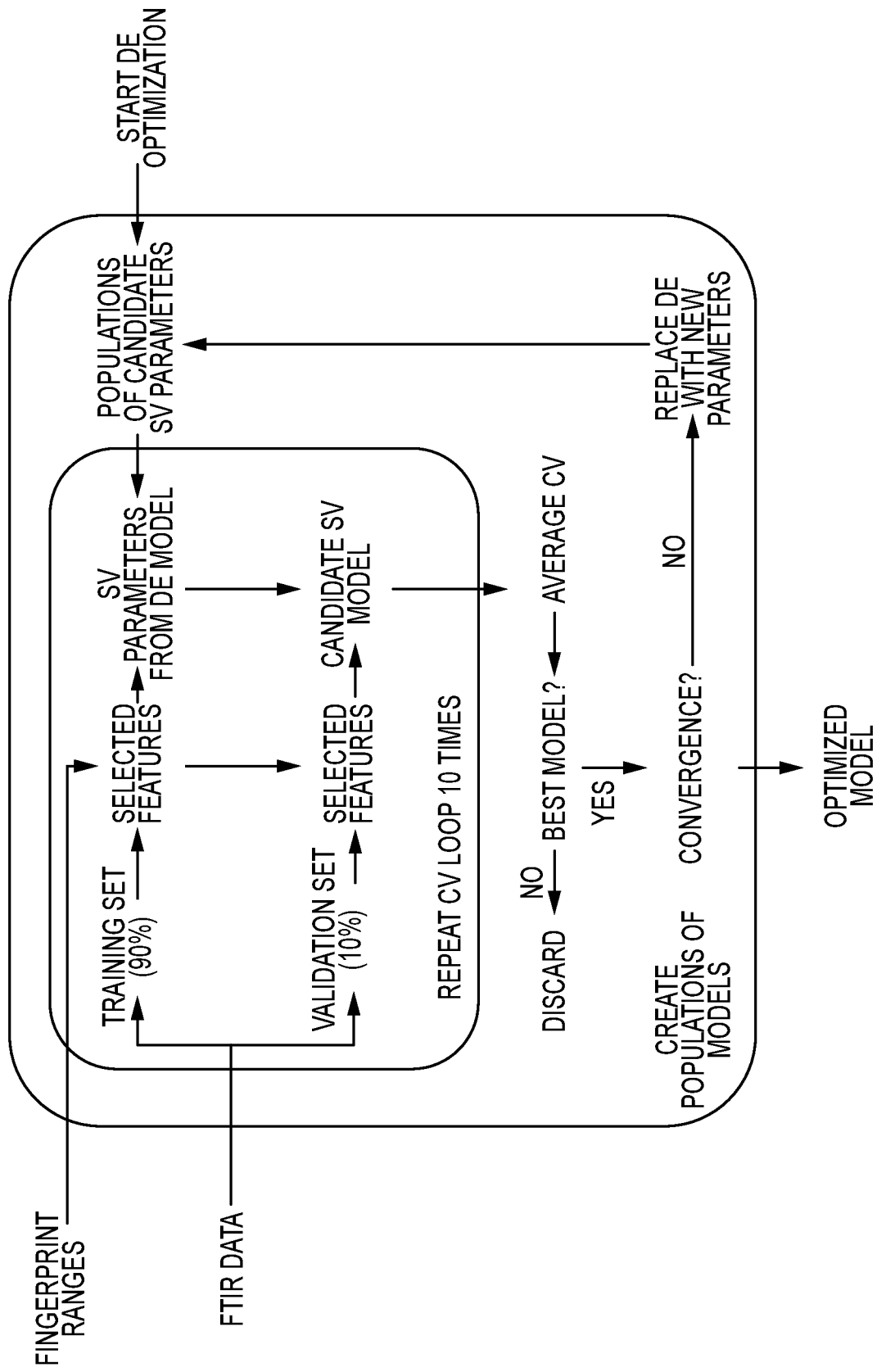
FIG. 4 is a flow chart illustrating an implementation for developing and training a support vector machine for a machine learning spectral data analyzer of a spectroscopic evaluation system.

Reference is made to FIG. 4 illustrating an example of such a modelling approach using a set of sample FT-IR data obtained from FT-IR spectroscopic investigation of test compositions, although the approach applies as well to spectral data that may be generated from other spectroscopic investigation techniques. As shown in FIG. 4, the FT-IR data sample set is processed 10 times through a cross-validation (CV) loop. For each application of the CV loop 90% of the sample data set is used as training data and the other 10% is used as validation data (data unknown to the model) to test accuracy of the model in predicting concentration values for the validation data. The 10% of the sample data used for validation is changed with each repeat of the CV loop, so that all data has been used both as training data and as validation data. This is combined with an iterative approach for refining SVM parameters (referred to as SV parameters in FIG. 4) though a differential evolution algorithm (referred to as DE in FIG. 4.) Initial parameter selections are provided that are then refined through the model development procedure in combination with the CV loop. For each set of SV parameters proposed by the DE, a 10-loop CV run is performed, and performance of the candidate model is determined based on the cross-validation fit for the candidate model (average validation accuracy of all 10 loops). This approach is repeated through varied sets off SV parameters proposed by the differential evolution algorithm, and with each pass, the candidate model is either retained as the best solution so far, or is discarded. The population of best model for a pass is also compared with prior best models for convergence, and the process may be continued until average cross-validation is high and revised models converge to a large degree. A separate SVM model may be developed in this way for each of the selected properties to be evaluated by the machine learning spectral data analyzer 108, for example for each component concentration in a multicomponent liquid composition and/or temperature of the multicomponent liquid composition. Even when a model is not developed to determine temperature values, training data for the concentration models should include both varying concentrations for the components of the liquid composition and varying temperature, otherwise the concentration values from the model will not be temperature-compensated and will be more prone to significant inaccuracies during use of the model due to temperature effects on investigated liquid compositions and resulting spectral data, unless the system of use is maintained a fixed constant temperature.

Once all support vector machine models with an appropriate soft margin treatment are developed with training data for all of the selected properties to be evaluated, the trained models may then be incorporated in a machine learning spectral data analyzer 108 and each model may be applied in the machine learning spectral data analyzer 108 to perform a support vector regression (SVR) through a fit of analyzed data to a hyperplane using the trained support vector machine algorithm to determine values for the selected property of each model, and output from all of the models may provide values for all of the selected properties (e.g., all of the selected component concentrations and/or temperature). The set of all of the property models covering all of the selected properties may, for convenience be referred to as the support vectors machine of a machine learning spectral data analyzer 108, even though such an overall model is made up of the separate property models each developed separately from the same training data. As may be appreciated, the larger and more extensive the training data that is used to develop a model, the better the performance of the model will tend to be in performing support vector regression on data to be analyzed.

As may be appreciated, the machine learning spectral data analyzer 108 may, but need not be, trained on each component that may be expected to be present or that may unexpectedly be present in a multicomponent liquid composition. For example with the large extent of data features processed in the spectral data of full spectral ranges for the trained components, the resulting SVM may be able to accommodate the presence during actual operation of additional components not present in the straining samples, while still providing full accuracy of concentration value determinations for trained components. However, if the concentration of such additional components become exceedingly large, accuracy on determinations for trained components may suffer to a significant and possibly undesirable extent. To enhance robustness of the machine learning spectral data analyzer, training samples containing all or nearly all liquid composition components expected to be present in significant concentrations may be preferred, even if training is performed on only some of those components that are the ones of interest for concentration determinations.

In the normal anticipated processing of FIG. 4, it is anticipated that the "selected features" of the FT-IR data will include all spectral data of the spanned IP spectrum in the FT-IR data. However, FIG. 4 shows an option for the process in which specific "fingerprint ranges" may be identified as the selected features of the FT-IR data on which the sum may be trained, rather than or in addition to using the full spectrum spectral data. Example 1 presented below, develops SVM models by alternative approaches—using the full spectrum spectral data and alternatively using only selected component fingerprint ranges for training each component.

EXAMPLES

Example 1

Figure 5:
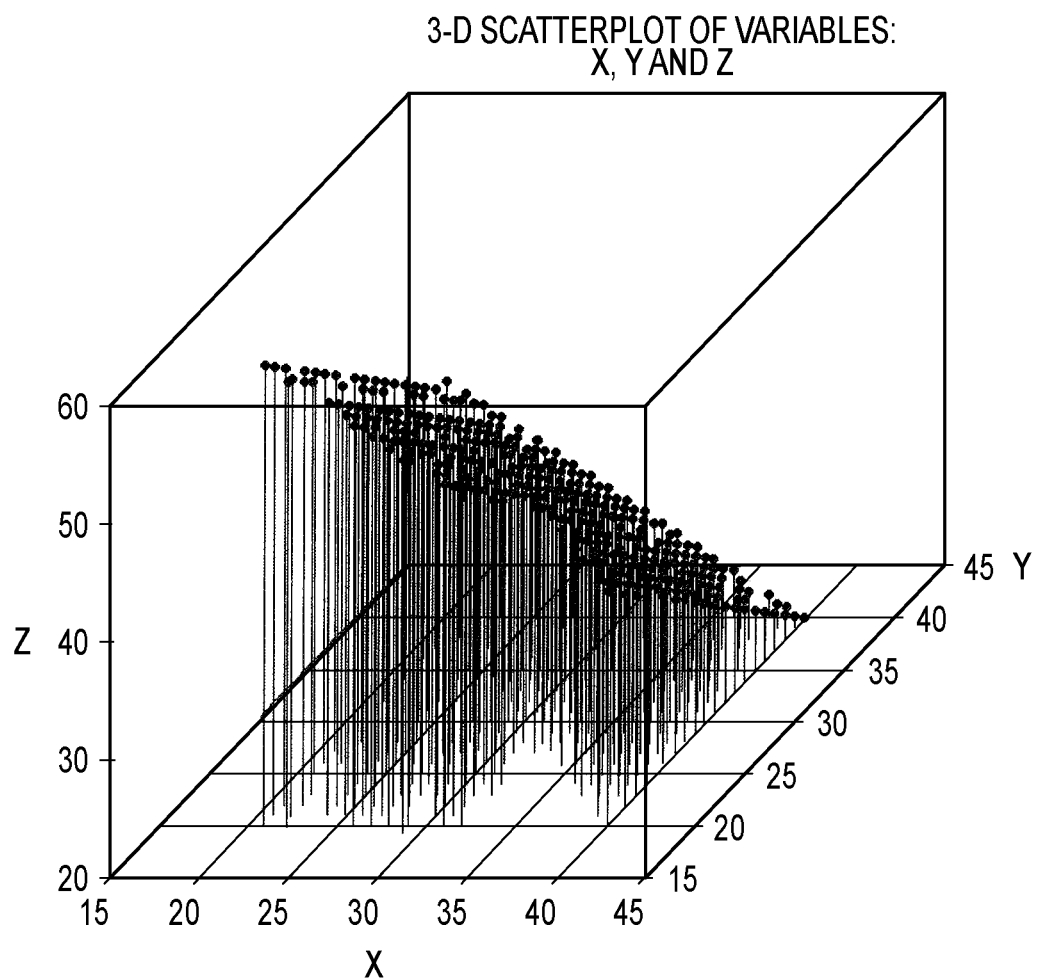
FIG. 5 is a plot showing concentrations of C-1 (X-axis), C-2 (Y-axis) and water (Z-axis) components for aqueous amine-based scrubbing solution samples of a matrix of samples prepared for developing and training a support vector machine for performing support vector regression analysis of spectral data in a machine learning spectral data analyzer of Example 1.
Figure 6:
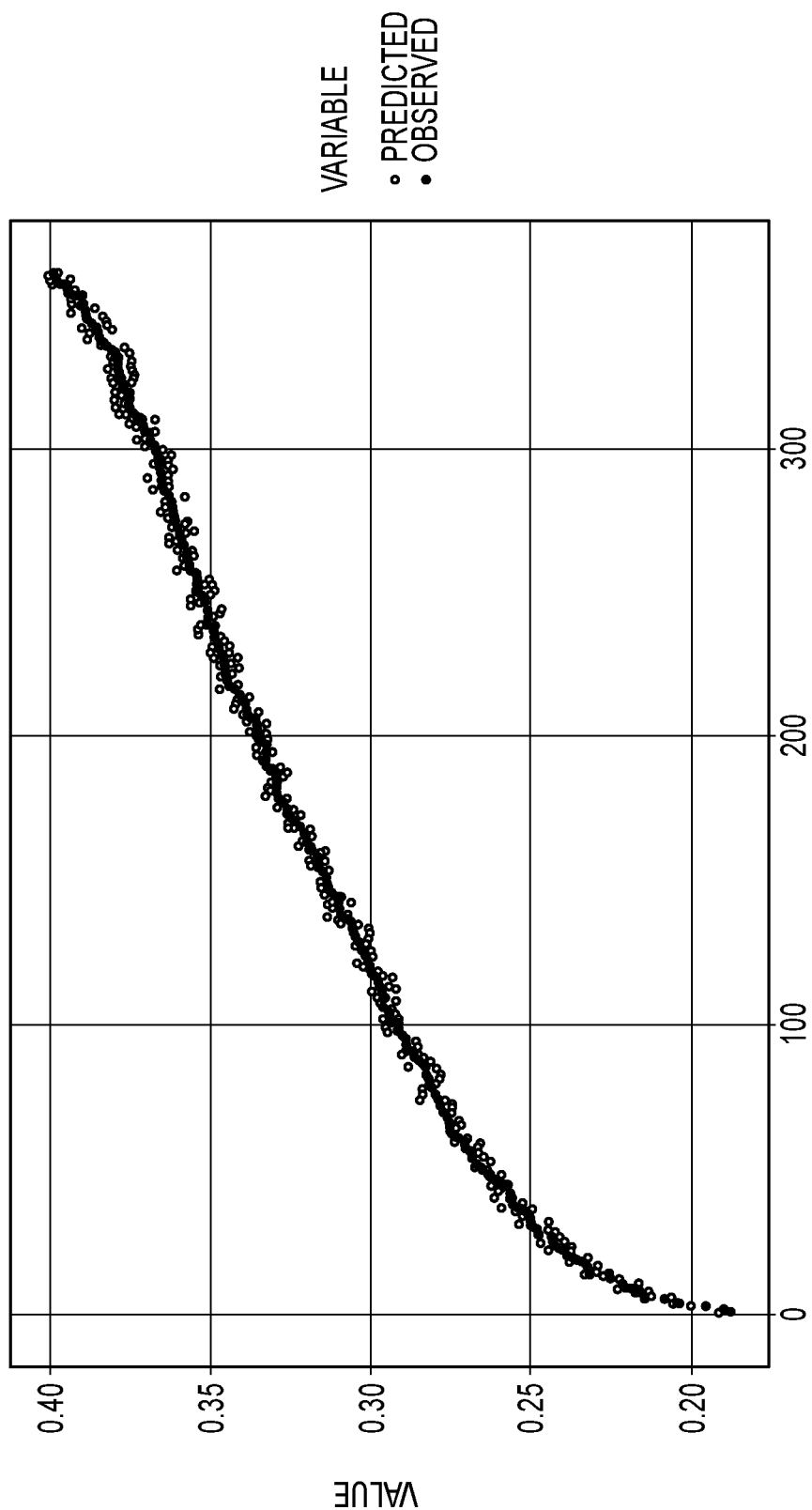
FIG. 6 is a plot showing observed values for the C-1 component in an aqueous amine-based scrubbing solution vs predicted values determined by the machine learning spectral data analyzer of Example 1.
Figure 7:
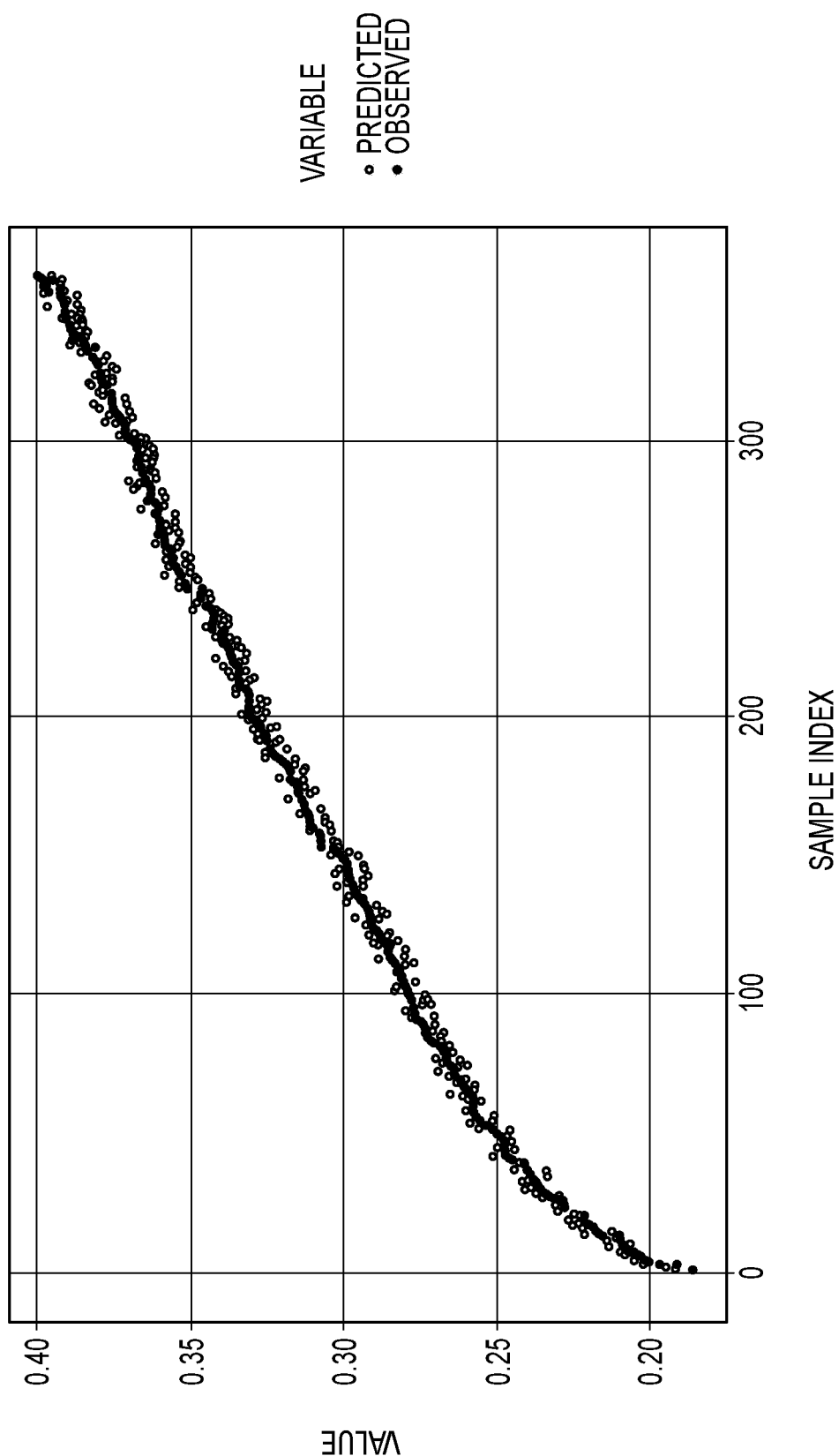
FIG. 7 is a plot showing observed values for the C-2 component in an aqueous amine-based scrubbing solution vs predicted values determined by the machine learning spectral data analyzer of Example 1.
Figure 8:
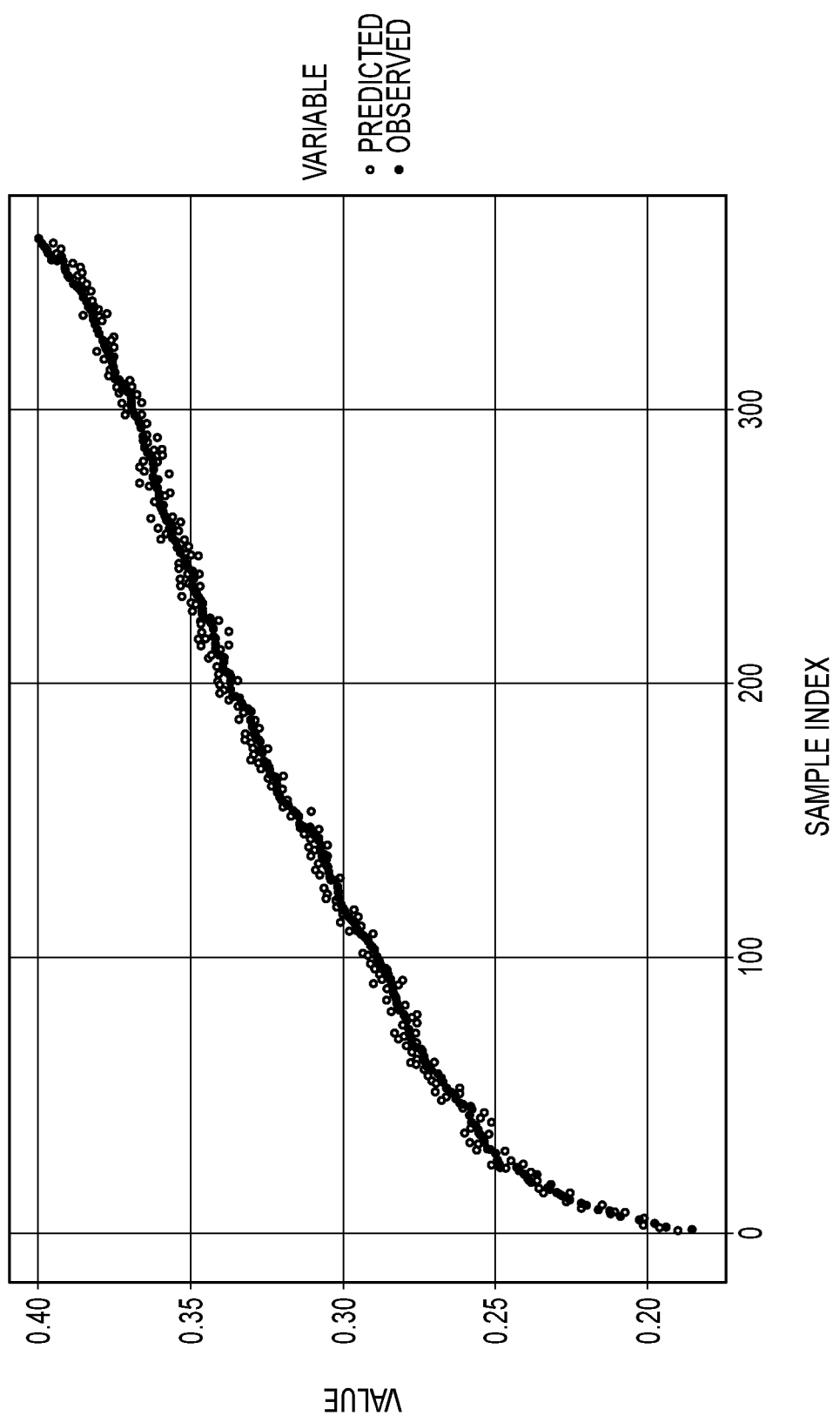
FIG. 8 is a plot showing observed values for water in aqueous an aqueous amine-based scrubbing solution vs predicted values determined by the machine learning spectral data analyzer of Example 1.

A machine learning spectral data analyzer with an SVM regression model was developed to predict by support vector regression analysis the concentrations of chemical components in an aqueous amine based scrubbing solution from FT-IR spectral data. The components in the scrubbing solution are an amine compound (C-1) for carbon dioxide capture, an organic promoter compound (C-2) that promotes rapid solubilization of carbon dioxide into the scrubbing solution and transfer to the amine compound, water ($H_2O$) and carbon dioxide. Sample FT-IR spectral data was obtained from ATR-FTIR spectroscopic investigation for prepared test compositions. The wavenumbers spanned during the ATR-FTIR investigation were from 580 $cm^{-1}$ to 4000 $cm^{-1}$ (corresponding to a wavelength range in the infrared region of about 17 to 2.5 micrometers), with a resolution of approximately 0.96 $cm^{-1}$ wavenumber across the spanned wavenumber range. A sampling plan is designed to achieve orthogonality. For each combination of C-1, C-2 and $H_2O$, three concentrations of $CO_2$ were added. 360 unique combinations of the first three components were run at three different $CO_2$ concentrations for a total of 1080 samples. Additionally, another 132 extra samples were run to check for time and operator dependent sampling error. FIG. 5 shows a graph of the sample design matrix, showing the concentrations of the C-1 component, C-2 component and water. Captured carbon dioxide makes up the balance of the sample composition not accounted for by the three plotted components. Note that the three plotted components form a plane. Since $CO_2$ represents 10% or less of the total for all samples, the three plotted components total a weight fraction of between 0.9 and 1.0 of the total scrubbing solution and form a plane. A weight fraction of 0.9 for the three components corresponds to maximum sample captured carbon dioxide loading of 10 weight percent ($CO_2$ weight fraction of 0.1) and a weight fraction of 1.0 for the three components corresponds with samples containing no captured carbon dioxide.

A Bruker Vertex 80 FTIR with a liquid nitrogen cooled detector and a ATR probe with a diamond tip was used. Samples were prepared gravimetrically. A mother solution of each C-1, C-2 and $CO_2$ composition was prepared and divided into two equal portions. One portion of this was loaded gravimetrically with $CO_2$ and the concentration confirmed with Total Inorganic Carbon analysis. Target $CO_2$ concentrations were created by gravimetric combination of the loaded and unloaded mother solutions. Spot checks of these target concentrations confirmed accurate preparation. The reference concentrations were prepared in the same manner.

SVM model development was performed in a process similar to that illustrated in FIG. 4. A radial bias function kernel was selected for the model and the SVM parameters were calculated using differential evolution optimization. 10-fold cross validation was used to evaluate the performance of the SVM regression model. In each fold of the cross validation, 10% of the data was randomly chosen for the testing set and the other 90% as the training set. The cross validation datasets were created without replacement so that every point was used in the test set. Root Mean Square Error (RMSE) was calculated on the test data set to compare performance.

Different preprocessing methods were tested along with changing the resolution of the data and limiting the features to specific fingerprint regions (as opposed to the resolution data as collected across the full spanned spectrum). Savitzky-Golay and Standard Normal Variate (SNV) transformations were employed to smooth and normalize the data. The full resolution data was tested and then lower resolution data was tested using only ⅓ the number of data points. Lastly, the effect of isolating the features specifically to known fingerprint regions ("fingerprint ranges" alternative of FIG. 4) were tested in following wave number ranges:

CC-1: 800-1600; 2400-3550
CC-2: 600-1550; 2800-3200
$H_2O$: 1500-1750; 2800-3700
$CO_2$: 800-1800

The results are shown in Table 1 and 2. The effect of using specific fingerprint regions for the different components had no significant effect on performance. Additionally, smoothing and normalizing the data also did not have any significant effect. The results of these experiments demonstrate that SVM can elucidate the four components using raw low resolution data with no need for feature selection.

TABLE 1

RMSE of the models under different preprocessing using entire spectra

| | C-1 | C-2 | $H_2O$ | $CO_2$ |
|---|---|---|---|---|
| Raw data | 0.003 | 0.004 | 0.003 | 0.002 |
| Savitzky-Golay | 0.005 | 0.007 | 0.004 | 0.002 |
| Savitzky-Golay & SNV | 0.004 | 0.006 | 0.004 | 0.002 |
| Savitzky-Golay Low Res | 0.005 | 0.007 | 0.004 | 0.002 |
| Savitzky-Golay SNV Low Res | 0.004 | 0.006 | 0.004 | 0.002 |

TABLE 2

RMSE of the models under different preprocessing using fingerprint regions

| | C-1 | C-2 | $H_2O$ | $CO_2$ |
|---|---|---|---|---|
| Raw data | 0.004 | 0.004 | 0.004 | 0.002 |
| Savitzky-Golay | 0.005 | 0.005 | 0.004 | 0.002 |
| Savitsky-Golay & SNV | 0.004 | 0.005 | 0.004 | 0.002 |
| Savitzky-Golay Low Res | 0.005 | 0.005 | 0.004 | 0.002 |
| Savitzky-Golay SNV Low Res | 0.004 | 0.005 | 0.004 | 0.002 |

Figure 9:
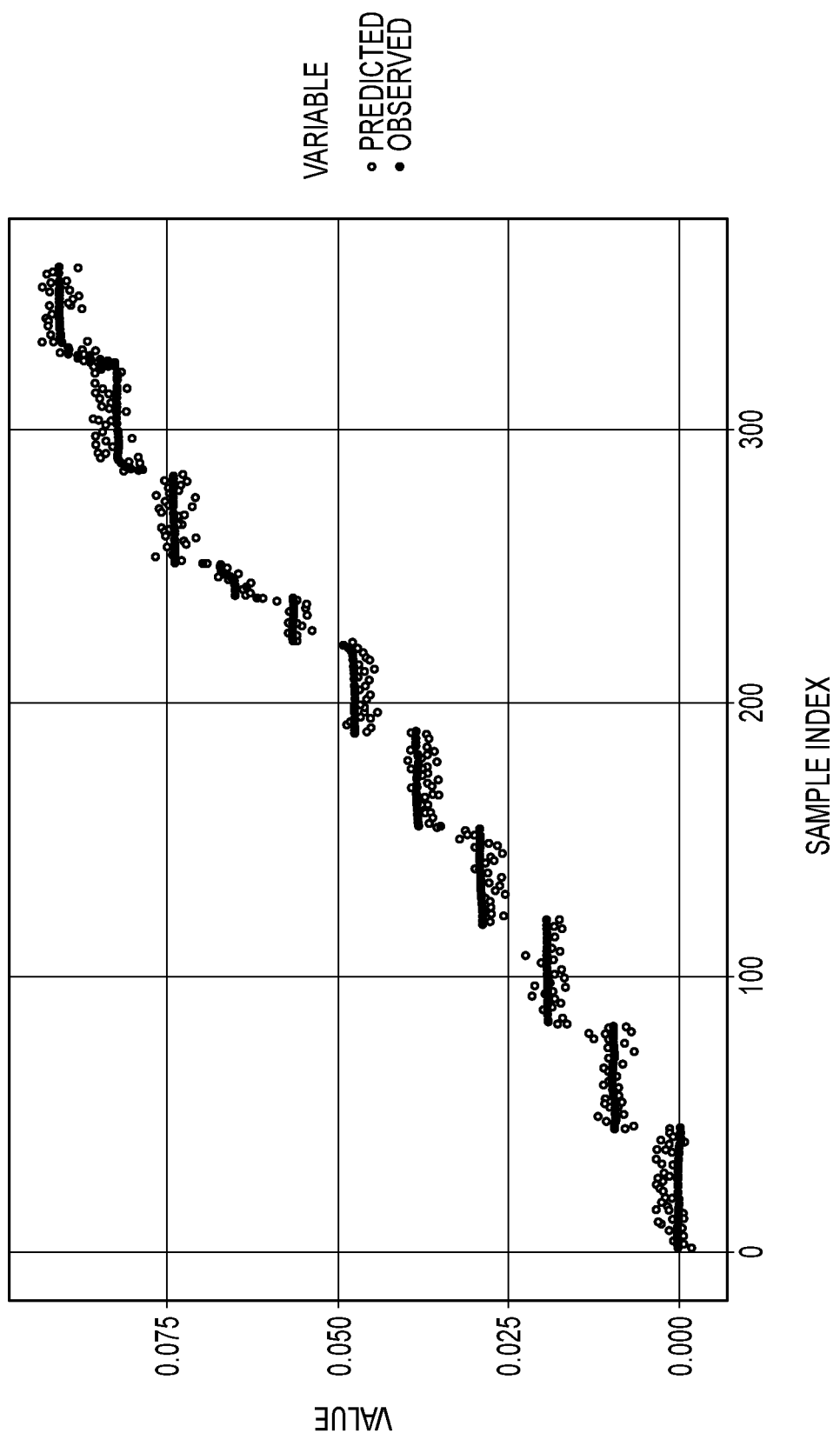
FIG. 9 is a plot showing observed values for captured carbon dioxide concentration in aqueous amine-based scrubbing solution vs predicted values determined by the machine learning spectral data analyzer of Example 1.

FIGS. 6-9 show the observed concentrations versus predicted concentration values from the SVM regression for each of the composition components (C-1, C-2, water and captured carbon dioxide, respectively). Concentrations shown on the Y-axis are expressed as weight fractions relative to the total weight of the scrubbing solution. The residuals are relatively small as evidenced by the low RMSE. FIG. 9 shows the high sensitivity of the SVM regression. In the graph of FIG. 9, there are 11 steps shown for captured $CO_2$ concentration. When creating the sampling protocol, the $CO_2$ concentrations were given in 1% by weight increments. $CO_2$ varied from 0 to 10% by weight so a total of 11 concentrations of $CO_2$ were present in the training samples. The SVM regression did a good job of fitting the $CO_2$ concentrations with an RMSE of 0.002.

To test the robustness of the SVM regression model, noise was added to the lab samples and then re-run through the SVM regression model. Noise was calculated from actual samples previously collected during demonstration processing at the National Carbon Capture Center (NCCC) located in Wilsonville, Alabama USA. It may be expected that these samples collected under real-world processing conditions would be noisier than samples made under laboratory conditions. The noise was calculated from these samples by using Savitsky-Golay smoothing to remove the functional curve to calculate the residuals. The residuals were assumed to be independently identically distributed (iid) and modeled as a normal distribution with a mean ($\mu$)=0 and standard deviation ($\sigma$)=standard deviation of the noise. Random noise was added to known samples with this distribution. To further test the robustness of the model, more noise was added at two and three times the standard deviation. The noise calculated from the NCCC samples had a standard deviation of 0.0018 Absorbance units. Two and three times the standard deviation was calculated to be 0.0036 and 0.0054, respectively. Lastly, samples were tested with noise added ten times the calculated noise from NCCC at 0.02 Absorbance units. Thus, the noise added to the model was N(0,0.0018), N(0,0.0036), N(0,0.0054) and N(0,02). The SVM regression model was trained on data without any noise added to see if the trained model would work effectively on the noisy data.

TABLE 4

RMSE of Noise on SVM Regression Model

|  | C-1 | C-2 | $H_2O$ | $CO_2$ |
|---|---|---|---|---|
| Raw data | 0.004 | 0.004 | 0.004 | 0.002 |
| N($\mu$, $\sigma$) | 0.004 | 0.004 | 0.004 | 0.002 |
| N($\mu$, 2$\sigma$) | 0.004 | 0.005 | 0.004 | 0.002 |
| N($\mu$, 3$\sigma$) | 0.004 | 0.005 | 0.004 | 0.002 |
| 2% | 0.006 | 0.007 | 0.006 | 0.004 |

As Table 4 shows, the SVM Regression model handles noise extremely well with little difference between raw data and noise added at N($\mu$,3$\sigma$). The SVM regression model performed well even with noise added at 0.02 Absorbance units.

Example 2

An SVM model for an amine-based scrubbing solution for carbon dioxide capture including C-1, C-2, water and carbon dioxide was developed to determine temperature-compensated concentration values for the components. Model development was similar to that described in Example 1 and illustrated in FIG. 4. Spectral data from prepared test compositions was generated from a range of temperature values and component concentrations. The temperature values tested were 20° C., 25° C., 30° C., 35° C. 40° C., 45° C., 50° C., 55° C. and 60° C. For each temperature, 120 different solutions with known concentrations of C-1, C-2, H2O and $CO_2$ were created for training the model. A support vector machine regression model was trained on the samples similar to as described in Example 1 and summarized in FIG. 4. To test the model, 776 samples were run through the model. FTIR spectra was created for each sample and run through the SVR model. Based on the results, temperature predictions could be made with an accuracy of about −0.05° C. with a standard deviation of 0.94° C. With a confidence of 95%, FTIR spectra can be predicted to within 1.35° C. with an average error of −0.05 C.

EXAMPLE IMPLEMENTATION COMBINATIONS

Some other contemplated embodiments of implementation combinations for various aspects of this disclosure, with or without additional features as disclosed above or elsewhere herein, are summarized as follows:

Some other contemplated embodiments of implementation combinations for various aspects of this disclosure, with or without additional features as disclosed above or elsewhere herein, are summarized as follows:

1. A spectroscopic evaluation system for evaluating concentrations of multiple components in a multicomponent liquid composition, the spectroscopic evaluation system comprising:
   a liquid contact probe configured to contact a multicomponent liquid composition for spectroscopic investigation and to transmit spectroscopic stimulation energy to interact with the multicomponent liquid composition for the spectroscopic investigation and resulting spectroscopic response energy away from the multicomponent liquid composition;
   an energy source connected with the liquid contact probe to provide the spectroscopic stimulation energy for the spectroscopic investigation;
   a spectrometer connected with the liquid contact probe to detect the spectroscopic response energy and to output spectral data corresponding to the spectroscopic response energy;
   a machine learning spectral data analyzer connected to the spectrometer for evaluation of the spectral data to determine a concentration value for each one of a plurality of components of the multicomponent liquid composition, wherein the machine learning spectral data analyzer is trained for each said component of the plurality of components over a corresponding trained concentration range for the said component and is trained for temperature effect on the spectral data over a trained temperature range to provide a temperature-compensated value for the concentration value of each said component for different temperatures across the full range of the trained temperature range.

2. A chemical processing system, comprising:
   chemical processing equipment with fluid containment space to contain the multicomponent liquid composition during chemical processing; and
   the spectroscopic evaluation system of example combination 1;
   wherein the liquid contact probe is disposed in fluid communication with the fluid containment space to contact the multicomponent liquid composition for the spectroscopic investigation when the fluid containment space contains the multicomponent liquid composition.

3. A chemical processing method, comprising:
   in the chemical processing system according to example combination 2, performing the chemical processing; and
   during the chemical processing, performing the spectroscopic evaluation on the multicomponent liquid composition in the fluid containment space.

4. The chemical processing system or method according to either one of example combination 2 or example combination 3, wherein:
   the chemical processing equipment comprises:
   a process vessel with an internal volume to contain process fluids for a chemical process operation during the chemical processing, the process vessel comprising a fluid inlet to input a feed of process fluid into the internal volume of the process vessel and a fluid outlet to output an effluent fluid from the internal volume of the process vessel;

a first fluid communication path to conduct the feed of process fluid to the inlet; and a second fluid communication path to conduct the effluent of process fluid way from the outlet; and the liquid contact probe is configured to contact the multicomponent liquid composition in one location selected from the group consisting of the internal volume of the process vessel, the first fluid communication path and the second fluid communication path.

5. A chemical processing system or method according to example combination 4, comprising multiple said liquid contact probes each disposed in fluid communication with different portions of the fluid containment space; and wherein:

a first said liquid contact probe is disposed to contact a first said multicomponent liquid composition in a first said location and a second said liquid contact probe is disposed to contact a second said multicomponent liquid composition in a second said location. The plurality of components of the first said multicomponent liquid composition and the plurality of components of the second said multicomponent liquid composition may be the same or different, and when the same may be present in the same or different concentrations. The first and second said multicomponent liquid compositions may be at different temperatures. The first and second said multicomponent liquid compositions may be the same process stream at different locations in the chemical processing system.

6. A chemical processing system or method according to example combination 5, wherein the first said location is in the first fluid communication path and the second said location is in the second fluid communication path.

7. A chemical processing system or method according to example combination 5, wherein the said first location is in the first fluid communication path or the second fluid communication path and the second said location is in the internal containment volume of the process vessel.

8. A chemical processing system or method according to example combination 6, comprising a third said liquid contact probe disposed in fluid communication with a third said location, wherein the third said location is in the internal containment volume of the process vessel.

9. A chemical processing system or method according to any one of example combinations 4-8, wherein the process vessel is a reaction vessel and the chemical processing comprises chemical reaction processing in the interior volume of the reaction vessel, the chemical reaction processing including at least one chemical reaction;

the feed of the process fluid includes at least one chemical reactant that reacts during the chemical reaction processing;

the effluent of the process fluid comprises a reaction product generated during the chemical reaction processing;

a said component of a said plurality of components of the first said multicomponent liquid composition is the chemical reactant; and a said component of a said plurality of components of the second said multicomponent liquid composition is the reaction product.

10. A chemical processing system or method according to any one of example combinations 4-8, wherein the process vessel is a reaction vessel and the chemical processing comprises chemical reaction processing in the interior volume of the reaction vessel, the chemical reaction processing including at least one chemical reaction and during the chemical reaction processing a chemical reactant is consumed and a reaction product is generated; and the plurality of components of a said multicomponent liquid composition includes the chemical reactant and the reaction product.

11. A chemical processing system or method according to example combination 10, wherein the said plurality of components including the chemical reactant and the reaction product also includes a second reaction product that is a byproduct contaminant of the chemical reaction processing.

12. A chemical processing system or method according to any one of example combinations 2-11, wherein a said multi-components liquid composition is flowing through the fluid containment space in contact with the liquid contact probe.

13. A chemical processing system or method according to any one of example combinations 2-12, wherein the chemical processing comprises continuous chemical processing.

14. A chemical processing system or method according to any one of example combinations 2-11, wherein the chemical processing comprises batch chemical processing.

15. A chemical processing system or method according to example combination 14, comprising performing the method of example combination 3, and wherein the method comprises performing the spectroscopic evaluation multiple times at different times during the batch processing to monitor changes in the multicomponent liquid composition over time during the batch chemical processing.

16. A chemical processing method according to example combination 15, comprising discontinuing the batch chemical processing based on results of at least one said spectroscopic evaluation.

17. A chemical processing system or method according to any one of example combinations 2-13, wherein the chemical processing comprises removing carbon dioxide from a carbon dioxide-containing gas mixture and the multicomponent liquid composition is an amine-based scrubbing solution, optionally an aqueous amine-based scrubbing solution, for capturing carbon dioxide and the plurality of components comprises water, an amine component for carbon dioxide capture and captured carbon dioxide.

18. A chemical processing system or method according to example combination 17, wherein a said multicomponent liquid composition for a said spectroscopic evaluation is a rich said scrubbing solution loaded with the captured carbon dioxide removed from the gas mixture.

19. A chemical processing system or method according to either one of example combination 17 or example combination 18, wherein a said multicomponent liquid composition for a said spectroscopic evaluation is a lean said scrubbing solution depleted in the captured carbon dioxide prior to contacting with the gas mixture to remove carbon dioxide from the gas mixture.

20. A chemical processing system or method according to example combination 19, wherein the lean said scrubbing solution is from scrubbing solution regeneration processing.

21. A chemical processing system or method according to any one of example combinations 1-20, comprising a process controller in communication connection with manipulable process equipment manipulable at the direction of the process controller to change at least one operating parameter of the chemical processing system or method based on process evaluation criteria including the determined concentration values for at least one said component of the plurality of components.

22. The chemical processing system or method according to example combination 21, wherein the manipulable process equipment includes at least one control valve operable at the direction of the process controller to change a flow rate of a fluid stream in the chemical processing system.

23. The chemical processing system or method according to example combination 22, wherein the fluid stream is a stream of the multicomponent liquid composition.

24. The chemical processing system or method according to example combination 22, wherein the fluid stream is a stream other than a stream of the multicomponent liquid composition.

25. The chemical processing system or method according to any one of example combinations 21-24, wherein the manipulable process equipment includes a heating unit or a cooling unit to heat or cool process fluid within the chemical processing system.

26. A chemical processing system for removing carbon dioxide from a carbon dioxide-containing gas mixture using an amine-based scrubbing solution, optionally a aqueous amine-based scrubbing solution, that is a multicomponent liquid composition comprising water, at least one amine component for carbon dioxide capture and captured carbon dioxide, the chemical processing system comprising:
  a carbon dioxide scrubbing unit to contact the gas mixture with the amine-based scrubbing solution for capture of carbon dioxide from the gas mixture in the scrubbing solution, the scrubbing unit comprising:
    a first gas inlet to receive a feed stream of the gas mixture to the scrubbing unit with carbon dioxide for removal in the scrubbing unit;
    a first gas outlet to output a treated stream of the gas mixture from the scrubbing unit having a lower carbon dioxide concentration than the feed stream of the gas mixture to the scrubbing unit;
    a first liquid inlet to receive a feed stream of said scrubbing solution for processing in the scrubbing unit to contact the gas mixture to remove carbon dioxide from the gas mixture for capture in the scrubbing solution; and
    a first liquid outlet to output an effluent stream of rich said scrubbing solution from the scrubbing unit, the rich said scrubbing solution having a concentration of captured carbon dioxide that is larger than a concentration of captured carbon dioxide in the feed stream of said scrubbing solution;
  a scrubbing solution regeneration unit to remove at least a portion of the captured carbon dioxide from the rich said scrubbing solution and prepare a lean said scrubbing solution depleted in the captured carbon dioxide relative to the rich said scrubbing solution, the regeneration unit comprising:
    a second liquid inlet to receive for processing in the regeneration unit a feed stream to the regeneration unit including at least a portion of the rich said scrubbing solution;
    a second gas outlet to output a gas effluent stream from the regeneration unit rich in carbon dioxide released from the scrubbing solution in the regeneration unit; and
    a second liquid outlet to output a liquid effluent stream from the regeneration unit including at least a portion of the lean said scrubbing solution;
  a first fluid communication path between the second liquid outlet of the regeneration unit and the first liquid inlet of the scrubbing unit to conduct at least a portion of the lean scrubbing solution from the regeneration unit to the scrubbing unit in the feed stream of said scrubbing solution;
  a second fluid communication path between the first liquid outlet of the scrubbing unit and the second liquid inlet of the regeneration unit to conduct at least a portion of the rich said scrubbing solution from the scrubbing unit to the regeneration unit;
  a spectroscopic evaluation system, optionally automated, comprising:
    a liquid contact probe configured to contact a multicomponent liquid composition for spectroscopic investigation and to transmit spectroscopic stimulation energy to interact with the multicomponent liquid composition for the spectroscopic investigation and resulting spectroscopic response energy away from the multicomponent liquid composition;
    an energy source connected with the liquid contact probe to provide the spectroscopic stimulation energy for the spectroscopic investigation;
    a spectrometer connected with the liquid contact probe to detect the spectroscopic response energy and to output spectral data corresponding to the spectroscopic response energy; and
    a machine learning spectral data analyzer connected to the spectrometer for evaluation of the spectral data to determine a concentration value for each one of a plurality of components of the multicomponent liquid composition, the plurality of components including the water, a said amine component and the captured carbon dioxide, wherein the machine learning spectral data analyzer is trained for each said component of the plurality of components over a corresponding trained concentration range for the said component. Optionally, the liquid contact probe is positioned to contact the scrubbing solution in a location in the scrubbing unit, the regeneration unit, the first fluid communication path or the second fluid communication path. As a further option, the spectroscopic evaluation system may include multiple said liquid contact probes positioned to contact the scrubbing solution at different locations, with each of the different locations being a location in the scrubbing unit, the regeneration unit, the first fluid communication path or the second fluid communication path.

27. A chemical processing system according to example combination 26, comprising a first process vessel for contacting the gas mixture with the scrubbing solution within the scrubbing unit to remove carbon dioxide from the gas mixture for capture in the scrubbing solution, the first process vessel being in fluid communication within the scrubbing unit with the first gas inlet, the first gas outlet, the first liquid inlet and the first liquid outlet.

28. A chemical processing system according to either one of example combination 26 or example combination 27, comprising a second process vessel for releasing captured carbon dioxide from the scrubbing solution in the regeneration unit, the second process vessel being in fluid communication within the regeneration unit with the second liquid inlet, the second gas outlet and the second liquid outlet.

29. A chemical processing system according to any one of example combinations 26-28, wherein:

the machine learning spectral data analyzer is trained for temperature effect on the spectral data over a trained temperature range to provide a temperature-compensated value for the concentration value of each said component for different temperatures across the full range of the trained temperature range.

30. A chemical processing system according to any one of example combinations 26-29, comprising multiple said liquid contact probes each disposed in at different locations in the chemical processing system to each contact a said multicomponent liquid phase at the corresponding said location.

31. A chemical processing system according to example combination 30, wherein at least one said location is in the first fluid communication path or the second fluid communication path to contact a said multicomponent liquid composition moving through the corresponding said fluid communication path.

32. A chemical processing system according to example combination 30, wherein a first said location is in the first fluid communication path to contact a said multicomponent liquid composition moving through the first fluid communication path and a second said location is in the second fluid communication path to contact a said multi-components liquid composition moving through the second fluid communication path.

33. A chemical processing system according to any one of example combinations 30-32, wherein at least one said location the first said location is in the carbon dioxide scrubbing unit to contact a said multicomponent liquid composition in a scrubbing vessel for contacting the gas mixture with the scrubbing solution within the scrubbing unit to remove carbon dioxide from the gas mixture for capture in the scrubbing solution.

34. A chemical processing system according to any one of example combinations 26-33, comprising the feed stream of said scrubbing solution flowing through the first liquid input into the carbon dioxide scrubbing unit.

35. A chemical processing system according to any one of example combinations 26-34, wherein the spectroscopic evaluation system is a spectroscopic evaluation system of any of example combinations 1-25.

36. An aqueous amine-based chemical processing method for removing carbon dioxide from a carbon dioxide-containing gas mixture the method comprising:
  carbon recovery processing of the gas mixture with an amine-based scrubbing solution, optionally an aqueous amine-based scrubbing solution, that is a multicomponent liquid composition comprising water, at least one amine component for carbon dioxide capture and captured carbon dioxide, the carbon recovery processing including:
    scrubbing processing, comprising capturing carbon dioxide from the gas mixture in the scrubbing solution, to prepare a rich said scrubbing solution enriched in the captured carbon dioxide relative to feed of said scrubbing solution to the scrubbing processing; and
    regeneration processing, comprising removing at least a portion of the captured carbon dioxide from at least a portion of the rich said scrubbing solution to prepare lean said scrubbing solution depleted in captured carbon dioxide relative to the rich said scrubbing solution; and
    recycling at least a portion of the lean said scrubbing solution in a feed of said scrubbing solution to the scrubbing processing to capture additional carbon dioxide;
  automated spectroscopic evaluation of operation of the carbon recovery processing by an automated spectroscopic evaluation system, comprising automatically performing by the spectroscopic evaluation system:
    periodic in-line spectroscopic investigation of the scrubbing solution for at least one location in the carbon recovery processing to generate spectroscopic response spectral data indicative of properties of the scrubbing solution at the corresponding said location of the spectroscopic investigation; and
    trained machine learning evaluation of the spectral data by a machine learning spectral data analyzer to determine a concentration value for each one of a plurality of components of the multicomponent liquid composition, the plurality of components including the water, a said amine component and the captured carbon dioxide, wherein the machine learning spectral data analyzer is trained for each said component of the plurality of components over a corresponding trained concentration range for the said component.

37. A method according to example combination 36, comprising:
  periodic automated evaluation of operating performance of the carbon recovery processing by the automated process evaluation system based on process evaluation parameters including the determined concentration values.

38. A method according to example combination 37, comprising:
  based on the evaluation of operating performance, changing at least one operating parameter of the carbon recovery processing.

39. A method according to example combination 38, wherein the changing at least one operating parameter comprises automatic generation by a process controller of control signals directed to manipulable process equipment to accomplish the changing at least one operating parameter.

40. A method according to example combination 39, wherein the manipulable process equipment includes at least one control valve.

41. A method according to any one of example combinations 36-40, wherein the method is performed in a chemical processing system according to any one of example combinations 26-34.

42. A system or method according to any one of example combinations 26-41, wherein the machine learning spectral data analyzer is trained for temperature effect on the spectral data over a trained temperature range, wherein each said concentration value is a temperature-compensated value.

43. A system or method according to any one of example combinations 26-42, wherein the scrubbing solution and the plurality of components comprise at least one said amine component selected from the group consisting of monoethanolamine, diethanolamine, N-methylethanol amine, diisopropanolamine, aminoethoxyethanol (diglycolamine), 2-amino-2-methylpropanol, benzylamine, methyl diethanolamine, a substituted benzylamine and piperazine.

44. A system or method according to any one of example combinations 26-43, wherein the scrubbing solution and the plurality of components comprise at least two said amine components selected from the group consisting of monoethanolamine, diethanolamine, N-methylethanolamine, diisopropanolamine, aminoethoxyethanol (diglycolamine), 2-amino-2-methylpropanol, benzylamine, methyl diethanolamine, a substituted benzylamine and piperazine.

45. A system or method according to any one of example combinations 26-44, wherein the scrubbing solution is an aqueous solution, with water present in the largest molar concentration.

46. A method for spectroscopic evaluation of a multicomponent liquid composition, the method comprising:
contacting a multicomponent liquid composition with a liquid contact probe of a spectroscopic evaluation system and through the liquid probe subjecting the multicomponent liquid composition to spectroscopic investigation with a spectroscopic stimulation energy transmitted through the liquid contact probe;
detecting spectroscopic response energy resulting from the spectroscopic investigation and generating spectral data corresponding to the detected spectroscopic response energy;
trained machine learning evaluation of the spectral data by a machine learning spectral data analyzer of a spectroscopic evaluation system to determine a concentration value for each one of a plurality of components of the multicomponent liquid composition, wherein the machine learning spectral data analyzer is trained for each said component of the plurality of components over a corresponding trained concentration range for the said component and is trained for temperature effect on the spectral data over a trained temperature range, wherein each said concentration value is a temperature-compensated value.

47. A chemical processing method, comprising chemical processing including:
feeding a reactant fluid to a reaction vessel containing at least one chemical reactant;
chemically reacting in a fluid reaction mixture in the reaction vessel a said reactant and forming in the reaction vessel at least one reaction product;
removing from the reaction vessel a product fluid comprising a said reaction product; and subjecting a liquid portion of at least one of the reactant fluid, the reaction fluid mixture and the product fluid to the method for spectroscopic evaluation of example combination 46 with the liquid portion as the multicomponent liquid composition.

48. A method according to example combination 47, comprising:
periodic automated evaluation of operating performance of the chemical processing by the automated process evaluation system based on process evaluation parameters including the determined concentration values.

49. A method according to example combination 48, comprising:
based on the evaluation of operating performance, changing at least one operating parameter of the chemical processing.

50. A method according to example combination 49, wherein the changing at least one operating parameter comprises automatic generation by a process controller of control signals directed to manipulable process equipment to accomplish the changing at least one operating parameter.

51. A method according to example combination 50, wherein the manipulable process equipment includes at least one control valve.

52. A method according to any one of example combinations 47-52, wherein the method is performed in a chemical processing system according to any of example combinations 2, 4-15 and 17-25.

53. A system or method according to any one of example combinations 1-52, wherein the machine learning spectral data analyzer comprises a support vector machine to evaluate the spectral data and determine the concentration values. The support vector machine may perform support vector regression analysis of the spectral data.

54. A system or method according to example combination 53, wherein the support vector machine includes a radial bias function kernel.

55. A system or method according to either one of example combination 53 or example combination 54, wherein the support vector machine comprises a soft margin set at least in part through a soft-margin constant.

56. A system or method according to any one of example combinations 1-55, wherein the machine learning spectral data analyzer comprises a neural network to evaluate the spectral data and to determine the concentration values.

57. A system or method according to any one of example combinations 1-56, wherein the machine learning spectral data analyzer is trained on at least 3 said components.

58. A system or method according to any one of example combinations 1-57, wherein the machine learning spectral data analyzer is trained for temperature effect on the spectral data over a trained temperature range, wherein each said concentration value is a temperature-compensated value.

59. A system or method according to example combination 58, wherein the trained temperature range spans at least 10° C.

60. A system or method according to either one of example combination 58 or example combination 59, wherein the trained temperature range has a lower limit of 30° C. or lower and an upper limit of 50° C. or higher.

61. A system or method according to example combination 60, wherein the lower limit is at least 5° C. and the upper limit is no larger than 100° C.

62. A system or method according to any one of example combinations 1-61, wherein the spectroscopic investigation comprises an infrared spectroscopic investigation.

63. A system or method according to any one of example combinations 1-62, wherein the spectroscopic stimulation energy is provided as electromagnetic radiation.

64. A system or method according to example combination 63, wherein the electromagnetic radiation of the spectroscopic stimulation energy spans a wave number range across at least 1000 wave numbers of the infrared spectrum.

65. A system or method according to either one of example combination 63 or example combination 64, wherein the electromagnetic radiation of the spectroscopic stimulation energy spans a wave number range having a lower limit of 600 $cm^{-1}$ or smaller and an upper limit of 3000 $cm^{-1}$ or larger.

66. A system or method according to any one of example combinations 1-65, wherein the spectroscopic response energy comprises electromagnetic radiation in the infrared spectrum.

67. A system or method according to example combination 66, wherein the electromagnetic radiation of the spectroscopic response energy spans a wave number range across at least 1000 wave numbers of the infrared spectrum.

68. A system or method according to either one of example combinations 66 or example combination 67, wherein the spectral data represents electromagnetic radia- 69. A system or method according to example combination 68, wherein the spectral data has a resolution across the wave number range of the spectral data of no larger than 6 $cm^{-1}$.

70. A system or method according to any one of example combinations 1-69, comprising a plurality of the liquid contact probes each connected with a different one of a plurality of said spectrometers.

71. A system or method according to example combination 70, wherein the machine learning spectral data analyzer is connected with each said spectrometer of the plurality of said plurality of said spectrometers 72. A system or method according to any one of example combinations 1-71, wherein the machine learning spectral data analyzer comprises an electronic processor and non-volatile memory with stored instructions executable by the electronic processor to perform trained machine learning evaluation of the spectral data and determine the concentration values.

73. A system or method according to any one of example combinations 1-72, wherein the liquid probe comprises an attenuated total reflectance (ATR) probe.

74. A system or method according to any one of example combinations 1-73, wherein the liquid probe is disposed to contact the multicomponent liquid in a flowing stream for the spectroscopic investigation.

75. A system or method according to any one of example combinations 1-74, wherein the liquid probe is disposed to contact the multicomponent liquid under processing conditions where the temperature of the multicomponent liquid varies over a temperature range of at least 5° C.

76. A system or method according to any one of example combinations 1-75, wherein the spectrometer comprises a Fourier transform-infrared (FT-IR) spectrometer.

77. A system or method according to any one of example combinations 1-76, wherein the energy source comprises an electromagnetic radiation source.

78. A system or method according to any one of example combinations 1-77, wherein the machine learning spectral data analyzer is configured to determine temperature of the multicomponent liquid composition.

The foregoing description of the present invention and various aspects thereof has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrated processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. A chemical processing system for removing carbon dioxide from a carbon dioxide-containing gas mixture using an amine-based scrubbing solution comprising water, at least one amine component and captured carbon dioxide, the chemical processing system comprising:
    a carbon dioxide scrubbing unit configured to contact the carbon dioxide-containing gas mixture with the amine-based scrubbing solution for capture of carbon dioxide from the carbon dioxide-containing gas mixture in the amine-based scrubbing solution, the scrubbing unit comprising:
        a first gas inlet to receive a feed stream of the carbon dioxide-containing gas mixture to the scrubbing unit with carbon dioxide for removal in the scrubbing unit;
        a first gas outlet to output a treated stream of the carbon dioxide-containing gas mixture from the scrubbing unit having a lower carbon dioxide concentration than the feed stream of the carbon dioxide-containing gas mixture to the scrubbing unit;
        a first liquid inlet to receive a feed stream of said amine-based scrubbing solution for processing in the scrubbing unit to contact the carbon dioxide-containing gas mixture to remove carbon dioxide from the carbon dioxide-containing gas mixture for capture in the amine-based scrubbing solution; and
        a first liquid outlet to output an effluent stream of rich said amine-based scrubbing solution from the scrubbing unit, the rich said amine-based scrubbing solution having a concentration of captured carbon dioxide that is larger than a concentration of captured carbon dioxide in the feed stream of said amine-based scrubbing solution; a scrubbing solution regeneration unit configured to remove at least a portion of the captured carbon dioxide from the rich said amine-based scrubbing solution and prepare a lean said amine-based scrubbing solution depleted in the captured carbon dioxide relative to the rich said amine-based scrubbing solution, the regeneration unit comprising:
  a second liquid inlet to receive a liquid feed stream to the regeneration unit including at least a portion of the rich said amine-based scrubbing solution;
  a second gas outlet to output a gas effluent stream from the regeneration unit rich in carbon dioxide released from the amine-based scrubbing solution in the regeneration unit; and
  a second liquid outlet to output a liquid effluent stream from the regeneration unit including at least a portion of the lean said amine-based scrubbing solution;
a first fluid communication path between the second liquid outlet of the regeneration unit and the first liquid inlet of the scrubbing unit to conduct at least a portion of the lean said amine-based scrubbing solution from the regeneration unit to the scrubbing unit in the feed stream of said amine-based scrubbing solution;
a second fluid communication path between the first liquid outlet of the scrubbing unit and the second liquid inlet of the regeneration unit to conduct at least a portion of the rich said amine-based scrubbing solution from the scrubbing unit to the regeneration unit;
an automated spectroscopic evaluation system, comprising:
  at least one liquid contact probe, wherein each said liquid contact probe is configured to contact a multicomponent liquid composition for spectroscopic investigation and to transmit spectroscopic stimulation energy to interact with the multicomponent liquid composition for the spectroscopic investigation and resulting spectroscopic response energy away from the multicomponent liquid composition;
  an energy source connected with the liquid contact probe to provide the spectroscopic stimulation energy for the spectroscopic investigation;
  a spectrometer connected with the liquid contact probe to detect the spectroscopic response energy and to output spectral data corresponding to the spectroscopic response energy;
  a machine learning spectral data analyzer connected to the spectrometer for evaluation of the spectral data to determine a concentration value for each one of a plurality of components of the multicomponent liquid composition, the plurality of components including water, a said amine component and captured carbon dioxide, wherein the machine learning spectral data analyzer is trained for each said component of the plurality of components over a corresponding trained concentration range for the said component; and
  the liquid contact probe is positioned to contact the amine-based scrubbing solution in a location in the scrubbing unit, the regeneration unit, the first fluid communication path or the second fluid communication path.

2. A chemical processing system according to claim 1, comprising
a first process vessel for contacting the carbon dioxide-containing gas mixture with the amine-based scrubbing solution within the scrubbing unit, the first process vessel being in fluid communication within the scrubbing unit with the first gas inlet, the first gas outlet, the first liquid inlet and the first liquid outlet.

3. A chemical processing system according to claim 2, comprising a second process vessel for releasing captured carbon dioxide from the amine-based scrubbing solution in the regeneration unit, the second process vessel being in fluid communication within the regeneration unit with the second liquid inlet, the second gas outlet and the second liquid outlet.

4. A chemical processing system according to claim 1, comprising multiple said liquid contact probes each disposed at different locations in the chemical processing system to each contact a said multicomponent liquid composition at a said location.

5. A chemical processing system according to claim 4, wherein at least one said location is in the first fluid communication path or the second fluid communication path to contact a said multicomponent liquid composition moving through the corresponding said fluid communication path.

6. A chemical processing system according to claim 4, wherein a first said location is in the first fluid communication path to contact a said multicomponent liquid composition moving through the first fluid communication path and a second said location is in the second fluid communication path to contact a said multicomponent liquid composition moving through the second fluid communication path.

7. A chemical processing system according to claim 5, wherein at least one said location is in the carbon dioxide scrubbing unit to contact a said multicomponent liquid composition in a scrubbing vessel for contacting the carbon dioxide-containing gas mixture with the amine-based scrubbing solution within the scrubbing unit.

8. A chemical processing system according to claim 1, comprising the feed stream of said amine-based scrubbing solution flowing through the first liquid inlet into the carbon dioxide scrubbing unit.

9. A chemical processing system according to claim 1, wherein the spectroscopic stimulation energy is provided as electromagnetic radiation that spans a wave number range across at least 1000 wave numbers of infrared spectrum.

10. A chemical processing system according to claim 9, wherein the wave number range spanned by the electromagnetic radiation of the spectroscopic stimulation energy has a lower limit of 600 $cm^{-1}$ or smaller and an upper limit of 3000 $cm^{-1}$ or larger.

11. A chemical processing system according to claim 10, wherein the spectroscopic response energy comprises electromagnetic radiation in the infrared spectrum that spans a wave number range across at least 1000 wave numbers of infrared spectrum.

12. A chemical processing system according to claim 11, wherein the spectral data represents electromagnetic radiation spanning a wave number range having a lower limit of 600 $cm^{-1}$ or smaller and an upper limit of 3000 $cm^{-1}$ or larger.

13. A chemical processing system according to claim 12, wherein the spectral data has a resolution across the wave number range of the spectral data of no larger than 6 $cm^{-1}$.

14. A chemical processing system according to claim 1, wherein:
  the machine learning spectral data analyzer is trained for temperature effect on the spectral data over a trained temperature range to provide a temperature-compensated value for the concentration value of each said component for different temperatures across the full range of the trained temperature range.

15. A chemical processing system according to claim 14, wherein the trained temperature range spans at least 10° C.

16. A chemical processing system according to claim 15, wherein the temperature range has lower limit of 30° C. or lower and an upper limit of 50° C. or higher.

17. A chemical processing system according to claim 16, wherein the lower limit is at least 5° C. and the upper limit is no larger than 100° C.

18. An amine-based chemical processing method for removing carbon dioxide from a carbon dioxide-containing gas mixture the method comprising:
carbon recovery processing of the carbon-dioxide-containing gas mixture with an aqueous amine scrubbing solution comprising water, at least one amine component and captured carbon dioxide, the carbon recovery processing including:
scrubbing processing, comprising capturing carbon dioxide from the carbon dioxide-containing gas mixture in the aqueous amine scrubbing solution, to prepare a rich said aqueous amine scrubbing solution enriched in captured carbon dioxide relative to a feed of said aqueous amine scrubbing solution to the scrubbing processing; and
regeneration processing, comprising removing at least a portion of the captured carbon dioxide from at least a portion of the rich said aqueous amine scrubbing solution to prepare lean said aqueous amine scrubbing solution depleted in captured carbon dioxide relative to the rich said aqueous amine scrubbing solution; and
recycling at least a portion of the lean said aqueous amine scrubbing solution in the feed of the aqueous amine scrubbing solution to the scrubbing processing to capture additional carbon dioxide;
automated spectroscopic evaluation of operation of the carbon recovery processing by an automated spectroscopic evaluation system, comprising automatically performing by the spectroscopic evaluation system:
periodic in-line spectroscopic investigation of the aqueous amine scrubbing solution at at least one location in the carbon recovery processing to generate spectroscopic response spectral data indicative of properties of the aqueous amine scrubbing solution at the at least one location of the spectroscopic investigation; and
trained machine learning evaluation of the spectral data by a machine learning spectral data analyzer to determine a concentration value for each one of a plurality of components of the multicomponent liquid composition, the plurality of components including water, a said amine component and captured carbon dioxide, wherein the machine learning spectral data analyzer is trained for each said component of the plurality of components over a corresponding trained concentration range for the said component.

19. A method according to claim 18, comprising:
periodic automated evaluation of operating performance of the carbon recovery processing by the automated process evaluation system based on process evaluation parameters including the determined concentration values; and
based on the evaluation of operating performance, changing at least one operating parameter of the carbon recovery processing.

20. An amine-based chemical processing method for removing carbon dioxide from a carbon dioxide-containing gas mixture the method comprising performing processing in the chemical processing system according to claim 1, the processing comprising:
carbon recovery processing of the carbon dioxide-containing gas mixture with an aqueous amine scrubbing solution comprising water, at least one amine component and captured carbon dioxide, the carbon recovery processing including:
scrubbing processing, comprising capturing carbon dioxide from the carbon dioxide-containing gas mixture in the aqueous amine scrubbing solution, to prepare a rich said aqueous amine scrubbing solution enriched in captured carbon dioxide relative to a feed of said aqueous amine scrubbing solution to the scrubbing processing; and
regeneration processing, comprising removing at least a portion of the captured carbon dioxide from at least a portion of the rich said aqueous amine scrubbing solution to prepare lean said aqueous amine scrubbing solution depleted in captured carbon dioxide relative to the rich said aqueous amine scrubbing solution; and
recycling at least a portion of the lean said aqueous amine scrubbing solution in the feed of the aqueous amine scrubbing solution to the scrubbing processing to capture additional carbon dioxide;
automated spectroscopic evaluation of operation of the carbon recovery processing by an automated spectroscopic evaluation system, comprising automatically performing by the spectroscopic evaluation system:
periodic in-line spectroscopic investigation of the aqueous amine scrubbing solution at at least one location in the carbon recovery processing to generate spectroscopic response spectral data indicative of properties of the aqueous amine scrubbing solution at the at least one location of the spectroscopic investigation; and
trained machine learning evaluation of the spectral data by a machine learning spectral data analyzer to determine a concentration value for each one of a plurality of components of the multicomponent liquid composition, the plurality of components including water, a said amine component and captured carbon dioxide, wherein the machine learning spectral data analyzer is trained for each said component of the plurality of components over a corresponding trained concentration range for the said component.

* * * * *